United States Patent
Rogers et al.

(10) Patent No.: US 12,063,306 B2
(45) Date of Patent: Aug. 13, 2024

(54) METHOD AND SYSTEM FOR TRANSMITTING LOCATION TRACKING DATA TO A MOBILE DEVICE OWNER WHEN THE MOBILE DEVICE IS NOT IN OWNER'S POSSESSION

(71) Applicant: F-Secure Corporation, Helsinki (FI)

(72) Inventors: Marc William Rogers, Moraga, CA (US); Brian James Buck, Livermore, CA (US)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 18/468,910

(22) Filed: Sep. 18, 2023

(65) Prior Publication Data
US 2024/0195632 A1 Jun. 13, 2024

Related U.S. Application Data

(63) Continuation of application No. 17/668,131, filed on Feb. 9, 2022, now Pat. No. 11,764,967, which is a continuation of application No. 16/685,811, filed on Nov. 15, 2019, now Pat. No. 11,251,962, which is a continuation of application No. 16/110,963, filed on Aug. 23, 2018, now Pat. No. 10,511,442, which is a continuation of application No. 14/297,524, filed on Jun. 5, 2014, now Pat. No. 10,084,603.

(60) Provisional application No. 61/834,388, filed on Jun. 12, 2013.

(51) Int. Cl.
*H04L 9/32* (2006.01)
*G06F 21/57* (2013.01)
*G09C 1/00* (2006.01)
*H04L 9/08* (2006.01)
*H04W 12/12* (2021.01)
*H04W 12/126* (2021.01)

(52) U.S. Cl.
CPC .......... *H04L 9/3234* (2013.01); *G06F 21/575* (2013.01); *G09C 1/00* (2013.01); *H04L 9/088* (2013.01); *H04W 12/12* (2013.01); *H04W 12/126* (2021.01); *H04L 2209/127* (2013.01); *H04L 2209/80* (2013.01)

(58) Field of Classification Search
CPC ... H04L 9/3234; H04L 9/088; H04L 2209/80; H04L 2209/127; G06F 21/575; H04W 12/12; H04W 12/126
USPC .......................................................... 713/2
See application file for complete search history.

(56) References Cited

U.S. PATENT DOCUMENTS

| | | | |
|---|---|---|---|
| 7,343,496 B1 * | 3/2008 | Hsiang | G07F 9/105 361/672 |
| 8,087,067 B2 * | 12/2011 | Mahaffey | G06F 21/30 726/25 |

(Continued)

*Primary Examiner* — Samson B Lemma
(74) *Attorney, Agent, or Firm* — Dergosits & Noah LLP

(57) ABSTRACT

A method for locating a mobile device which is not in possession of the owner using an owner verification server. A mobile network operator server sends a message to the owner verification server requesting verification of ownership. The owner verification server retrieves ownership status and transmits a request to the mobile network operator server to transmit location tracking data when the ownership status indicates that the device is not in the owner's possession. The owner verification server forwards the location tracking data to the device owner.

17 Claims, 22 Drawing Sheets

(56) References Cited

U.S. PATENT DOCUMENTS

| | | | | |
|---|---|---|---|---|
| 8,370,168 | B1* | 2/2013 | Jenkins | G06F 21/60 |
| | | | | 705/1.1 |
| 8,855,601 | B2* | 10/2014 | Grkov | G06F 21/88 |
| | | | | 455/410 |
| 2005/0153685 | A1* | 7/2005 | Choi | H04M 1/66 |
| | | | | 455/418 |
| 2006/0145839 | A1* | 7/2006 | Sandage | G06F 21/88 |
| | | | | 340/539.17 |
| 2009/0257595 | A1* | 10/2009 | de Cesare | G06F 21/575 |
| | | | | 726/16 |
| 2009/0300771 | A1* | 12/2009 | Bhansali | G06Q 20/3674 |
| | | | | 726/26 |
| 2009/0328131 | A1* | 12/2009 | Chaturvedi | G06F 21/31 |
| | | | | 726/19 |
| 2010/0115092 | A1* | 5/2010 | Westin | H04L 67/02 |
| | | | | 709/224 |
| 2010/0130167 | A1* | 5/2010 | Bennett | H04W 12/02 |
| | | | | 455/411 |
| 2010/0210240 | A1* | 8/2010 | Mahaffey | H04L 41/22 |
| | | | | 455/411 |
| 2010/0216429 | A1* | 8/2010 | Mahajan | G06F 21/88 |
| | | | | 455/410 |
| 2011/0241872 | A1* | 10/2011 | Mahaffey | H04L 63/14 |
| | | | | 340/539.13 |
| 2012/0188064 | A1* | 7/2012 | Mahaffey | H04L 63/1441 |
| | | | | 340/384.1 |
| 2012/0214451 | A1* | 8/2012 | Richardson | H04W 12/082 |
| | | | | 455/414.1 |
| 2014/0273954 | A1* | 9/2014 | Bienas | H04W 12/08 |
| | | | | 455/411 |
| 2016/0012498 | A1* | 1/2016 | Prasad | G06Q 30/0185 |
| | | | | 705/26.1 |

\* cited by examiner

405 → Provide a security application program to a system builder for the system builder to install the security application in a first memory partition of a mobile communications device
410

Register a first user as being an owner or authorized user of the mobile communications device
415

Intercept an attempt to clear all user data stored in a second memory partition of the mobile communications device, different from the first memory partition
420

Determine that the attempt was made by an unauthorized second user who is not registered as an owner or authorized user of the mobile communications device
425

Upon the determination, generate an alert
430

FIG. 4

| Device ID | Owner Name | User name | Password | Device Status |
|---|---|---|---|---|
| 213 | John Smith | jsmith | violet | OK |
| 213 | John Smith | rscott | tiger | OK |
| 303 | Bill Watkins | bwatkins | seasame | STOLEN |

FIG. 14

METHOD AND SYSTEM FOR TRANSMITTING LOCATION TRACKING DATA TO A MOBILE DEVICE OWNER WHEN THE MOBILE DEVICE IS NOT IN OWNER'S POSSESSION

CROSS-REFERENCE TO RELATED APPLICATIONS

The present Application is a continuation of U.S. application Ser. No. 17/668,131 entitled "Method and System for Verifying Device Ownership Upon Receiving A Tagged Communication From the Device," filed on Feb. 9, 2022, and now U.S. Pat. No. 11,764,967 issued on Sep. 19, 2023, which is a continuation of U.S. application Ser. No. 16/685,811, entitled "Method And System For Providing A Security Component To A Mobile Communications Device In An Application," filed on Nov. 15, 2019, which is a continuation of U.S. application Ser. No. 16/110,963, entitled "Method And System For Responding To An Unauthorized Action On A Mobile Communications Device," filed Aug. 23, 2018, now U.S. Pat. No. 10,511,442, which is a continuation of U.S. application Ser. No. 14/297,524, entitled "Method And System For Rendering A Stolen Mobile Communications Device Inoperative," filed on Jun. 5, 2014, now U.S. Pat. No. 10,084,603, which claims the benefit of U.S. Provisional Patent Application 61/834,388, entitled "Method and System for Rendering a Stolen Mobile Communications Device Inoperative", filed on Jun. 12, 2013. The contents of each of these applications are hereby incorporated by reference.

TECHNICAL FIELD

The present invention relates to the field of information technology, including, more particularly, to systems and techniques for mobile device security.

BACKGROUND OF THE INVENTION

Devices such as smartphones and tablet computers have become an important accessory, and perhaps even a vital accessory, for many people. These devices can store large amounts of a person's data such as a music collection, documents, contacts, notes, reminders, calendar dates, pictures, video, and much more. These devices may include many different application programs or apps that people have bought for the device such as productivity apps, games, news apps, and so forth. These apps have provided new ways for consumers to access content, connect with others, improve productivity, relax, and discover new things—just to name a few examples.

A key feature of such devices is that they are small and relatively lightweight. So, people can often be found using their devices in public such as on subways, on buses, while walking outside, in coffee shops, in restaurants, and so forth. These devices can be very expensive. As a result, these devices are particularly attractive to thieves. For example, a common method of theft on subways is to snatch devices away from unsuspecting owners right before the subway doors close. Once the mobile device has been stolen, it can take just minutes for the thief to wipe the device clean and ready the device for resale. Recovery of the mobile device can be very difficult.

Therefore, there is a need to provide systems and techniques to discourage mobile device theft.

BRIEF SUMMARY OF THE INVENTION

A technique provides for rendering a stolen phone inoperative by destroying the boot sequence, storage encryption keys, or both, is provided.

The disclosed subject matter relates to a method for determining, at a security component on the mobile communications device, that the mobile communications device is in a first state, and causing, at the security component, the removal of a cryptographic key on the mobile communications device.

The disclosed subject matter also relates to a method for determining, at a security component on a mobile communications device, that the mobile communications device is not in the possession of an authorized user. When the mobile communications device is determined to not be in the possession of an authorized user, a cryptographic key is received from a server at the security component. Device storage contents are encrypted with the cryptographic key, and after encrypting the device storage contents, a removal of the cryptographic key is affected on the mobile communications device.

The disclosed subject matter also relates to a non-transitory computer-readable medium comprising instructions stored therein. The instructions are for receiving, at a server, an indication that a mobile communications device is not in the possession of an authorized user. A first command is sent from the server for the mobile communications device to encrypt data stored on the mobile communications device using a cryptographic key from the server. Upon receiving from the mobile communications device confirmation that the data stored has been encrypted, a second command is sent from the server for the mobile communications device to remove the cryptographic key.

Other objects, features, and advantages of the present invention will become apparent upon consideration of the following detailed description and the accompanying drawings, in which like reference designations represent like features throughout the figures.

BRIEF DESCRIPTION OF THE FIGURES

FIG. 4 shows a flow of a specific implementation of the security application program.

FIG. 14 shows an example of an owner registry.

DETAILED DESCRIPTION

Figure 1:
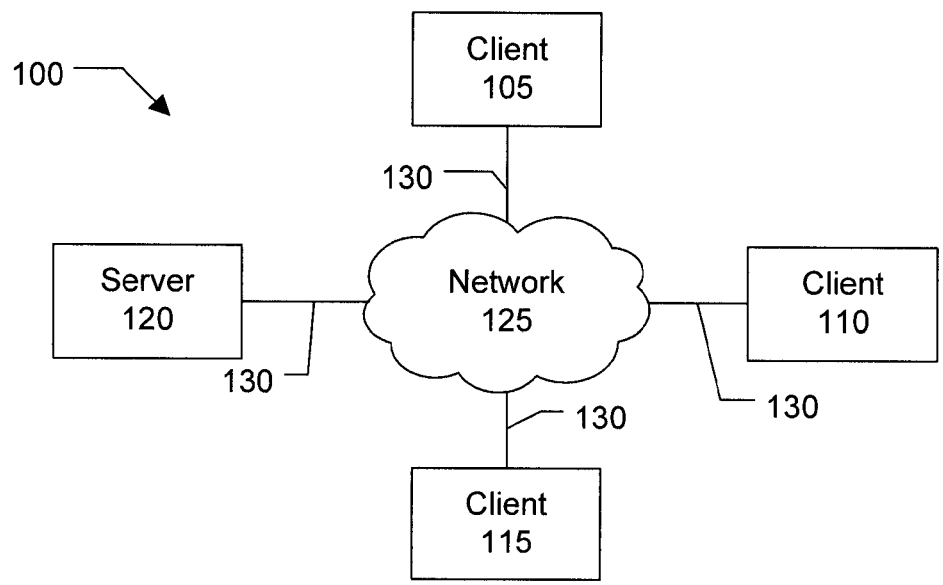
FIG. 1 shows a simplified block diagram of a mobile device persistent security system implemented in a distributed computing network connecting a server and clients.

FIG. 1 is a simplified block diagram of a distributed computer network 100 incorporating a specific embodiment of a system for a mobile device persistent security mechanism. Computer network 100 includes a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

Client systems 105, 110, and 115 typically request information from a server system which provides the information. Server systems by definition typically have more computing and storage capacity than client systems. However, a particular computer system may act as both a client or a server depending on whether the computer system is requesting or providing information. Aspects of the system may be embodied using a client-server environment or a cloud-cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. Some example client systems include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™ or any device running the Apple iOS®, Android® OS, Google Chrome® OS, Symbian OS®, Windows Mobile® OS, Windows Phone, BlackBerry® OS, Embedded Linux, Tizen, Sailfish, webOS, Palm OS® or Palm Web OS®.

In a specific embodiment, a "web browser" application executing on a client system enables users to select, access, retrieve, or query information and/or applications stored by server system 120. Examples of web browsers include the Android® browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 2:
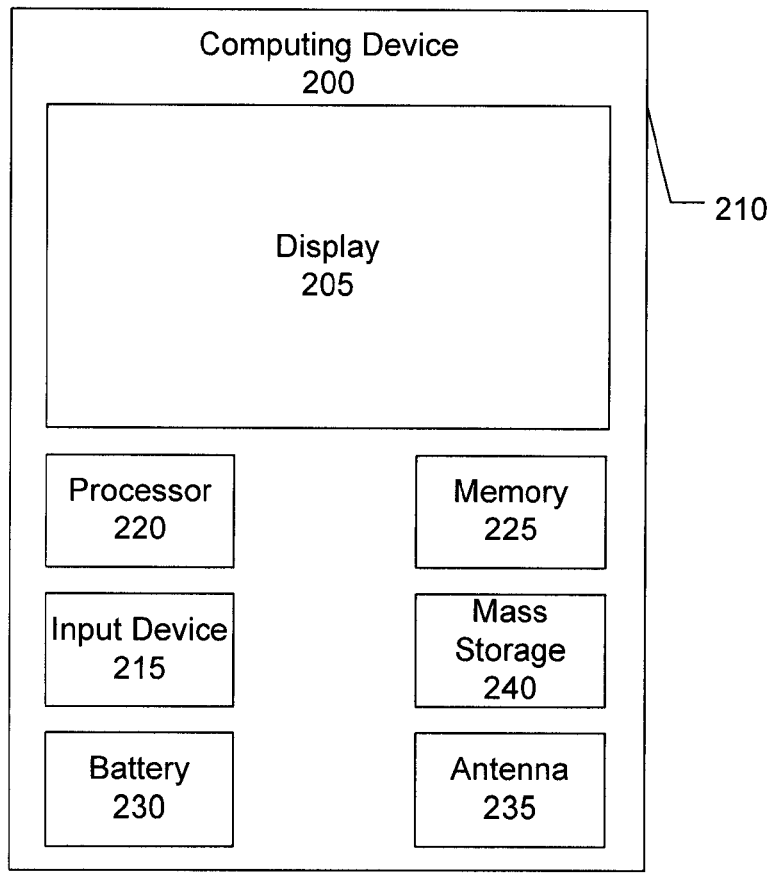
FIG. 2 shows a more detailed diagram of an example of a client of the mobile device persistent security system.

FIG. 2 shows an example of a computer system such as a client system. In an embodiment, a user interfaces with the system through a client system, such as shown in FIG. 2. Mobile client communication or portable electronic device 200 includes a display, screen, or monitor 205, housing 210, and input device 215. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The system may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use. Other configurations of subsystems suitable for use will be readily apparent to one of ordinary skill in the art. For example, in a specific implementation, the computing device is mobile communication device such as a smartphone or tablet computer. Some specific examples of smartphones include the Droid Incredible and Google Nexus One®, provided by HTC Corporation, the iPhone® or iPad®, both provided by Apple, BlackBerry Z10 provided by BlackBerry (formerly Research In Motion), and many others. The computing device may be a laptop or a netbook. In another specific implementation, the computing device is a non-portable computing device such as a desktop computer or workstation.

A computer-implemented or computer-executable version of the program instructions useful to practice the systems and techniques described in this application may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the techniques described in this application may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the techniques described in this application may be transmitted via wires, radio waves, or through a network such as the Internet. In another specific embodiment, a computer program product including a variety of software program code to implement features described in this application is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Windows Phone, Symbian®, BlackBerry® OS, BlackBerry 10 OS, BlackBerry Tablet OS, Palm web OS, bada, Embedded Linux®, MeeGo®, Maemo®, Limo®, Tizen, Sailfish, or Brew OS. Other examples of operating systems include one of the Microsoft Windows family of operating systems (e.g., Windows 95, 98, Me, Windows NT®, Windows 2000, Windows XP®, Windows XP x64 Edition, Windows Vista®, Windows 7, Windows 8, Windows CE, Windows Mobile®, Windows Phone 7®, Windows Phone 8®), Linux®, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the systems and methods in this application using a wireless network employing a protocol such as Wi-Fi (IEEE standards 802.11, 802.11a, 802.11b, 802.11e, 802.11g, 802.11i, 802.11n, 802.11ac, and 802.11ad, just to name a few examples). For example, signals from a computer may be transferred, at least in part, wirelessly to components or other computers.

Figure 3A:
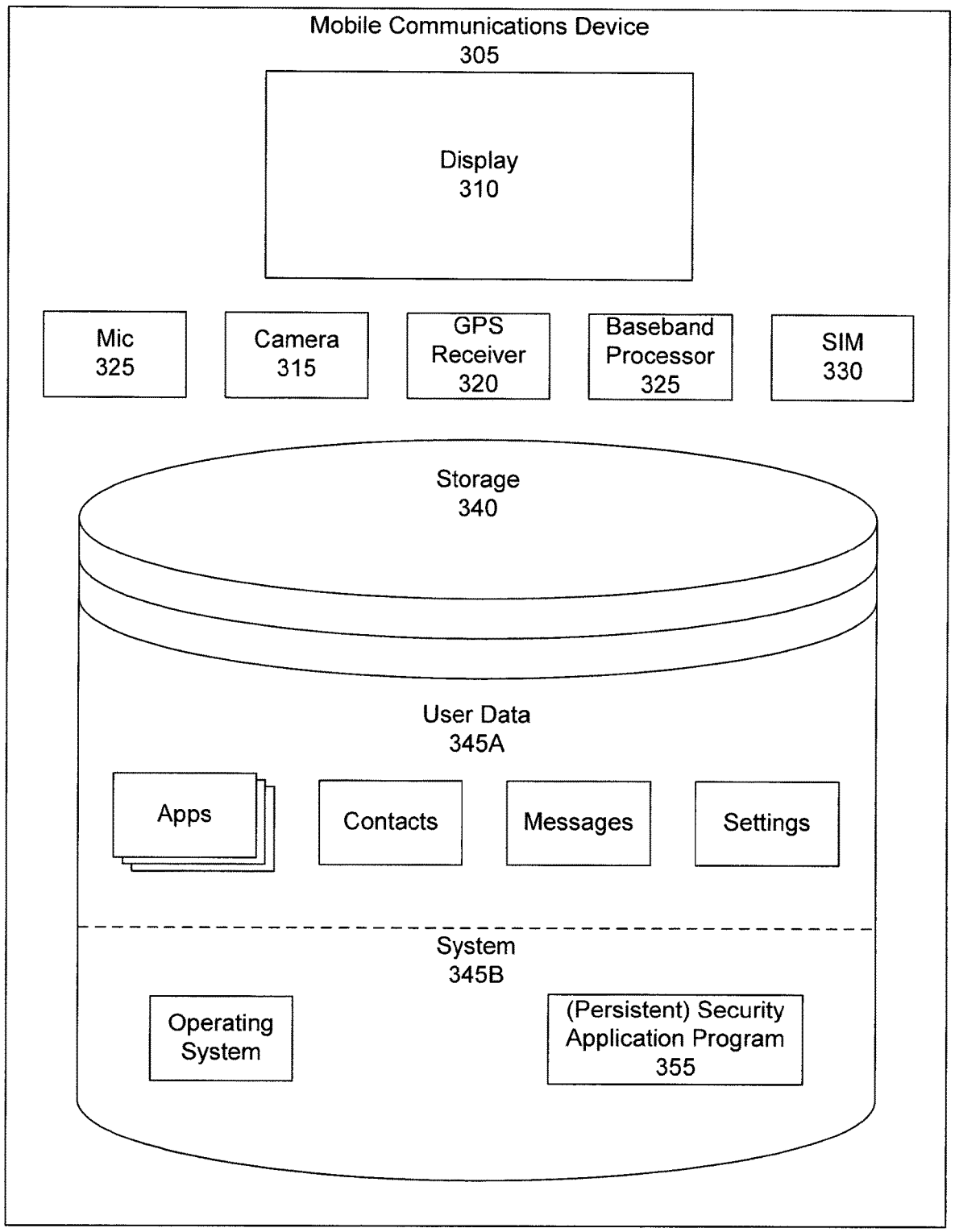
FIG. 3A shows a block diagram of a specific implementation of a security application program having been preloaded in a system partition of a mobile communications device.

FIG. 3A shows a block diagram of a mobile communications device (MCD) 305 that includes a persistent security mechanism. The mobile communications device includes components, including hardware and software, similar to that shown in FIG. 2 and described above. For example, mobile communications device 305 may include a display 310 (e.g., touchscreen or touch-sensitive display), one or more cameras 315, a global positioning system (GPS) receiver 320, microphone 325, baseband processor 325, subscriber identity module or SIM card 330, storage component 340, communication chipsets (e.g., WiFi, Bluetooth, NFC, FM, or RF), transceivers, transmitters, receivers, power management chip, processor, memory, removable memory card, acceleration sensor, antenna, battery, and other components that may be found in a smartphone or tablet computing device.

Storage component 340 includes any nonvolatile memory component such as a flash drive, flash memory (e.g., NAND type flash memory), SIM card, solid-state drive (SSD), secure digital (SD) card, hard drive, internal or external memory (e.g., removable SD card), and the like. Storage 340 may be divided into any number of partitions. In the example shown in FIG. 3A, the storage includes a data or user data partition 345A and a system partition 345B. A partition refers to a logical storage unit on a physical memory component. Partitions can be used to help protect or isolate files and separate the operating system files from user files.

Table A below shows an example of some of the typical partitions that may be found on an Android phone or tablet.

TABLE A

| Partition | Description |
|---|---|
| /boot | Stores the components (e.g., bootloader, kernel, or ramdisk) that allow the device to boot and manage firmware updates. |
| /system | Stores the operating system such as the Android user interface. |
| /recovery | Can be considered as an alternative boot partition to enable booting of the device into a recovery console for performing advanced recovery and maintenance operations. |
| /data | Stores the user's data such as contacts, messages, settings and application programs (or apps) that the user has installed. |
| /cache | Stores frequently accessed data and app components. |
| /misc | Stores miscellaneous system settings in form of on/off switches. These settings may include CID (Carrier or Region ID), USB configuration and certain hardware settings, and so forth. |

In a specific implementation, a feature of the system includes a security program 355 that is installed in the system partition of the device internal memory. The security program provides theft protection and device recovery services in the event that the device is stolen, lost, or missing. In this specific implementation, the security program is pre-installed or pre-loaded onto the device. The installation of the security program in the system partition protects the security program from being deleted during a wipe operation.

For example, a thief upon stealing the mobile communications device from the device owner or authorized user may attempt to wipe the device in order to resell the device. Wipes can happen by the boot loader by pressing several keys or via USB (generally a boot loader does not communicate with the network) and without network coverage. For example, the device may be put in a metal box and a master clear may be performed.

A wipe—which may also be referred to as a clear, factory reset, or hard reset— deletes the "/data" partition and thus all the user data, e.g., contacts, messages, user-installed apps, and so forth. The wipe can restore the device to the state of the device when it was first booted (or the state after the last ROM installation or upgrade). Data stored in the "/system" partition, however, is preserved during a wipe. Thus, a user who has had their device stolen and subsequently wiped, can use the security program to help recover their device. The security program may be referred to as a persistent security program because it persists after a wipe or clear operation.

More particularly, a data clear may include a master clear, formatting a partition, a factory reset, flashing firmware, erasing a removable memory card, or combinations of these. The security program software can include mobile device location, wipe, lock, etc. software. Features that the security program may provide are described in U.S. Pat. No. 8,087,067, issued Dec. 27, 2011, and U.S. patent application Ser. No. 13/162,477 filed Jun. 16, 2011; Ser. No. 13/295,017 filed Nov. 11, 2011; Ser. No. 13/410,979, filed Mar. 2, 2012; and Ser. No. 13/423,036, filed Mar. 16, 2012, each of which are incorporated by reference along with all other references cited in this patent application.

The security program may enforce a policy (e.g., device only allowed to be used in a particular geographic area (e.g., a particular area code, zip code, city, or town), phone disabled after a particular amount of time, phone disabled after any tampering). The security program may include bootstrap software (e.g., software that is used to provision other software or otherwise initially configure a device). For example, such software may be used to provision required applications and activate them. The security program may include application marketplace/store/download service. For example, Google Play, or Apple App Store. The security program may include any form of software that accepts commands from a server and performs them, e.g., Google Checkin Service, Apple Push Notification Service, and the like.

When installed in a baseband radio, the security program may receive commands, validate them, and perform actions (e.g., locate, lock) without the application processor receiving the commands. In a specific implementation, the baseband radio receives and validates SMS commands (e.g., by validating digital signatures) and performs actions, (e.g., send in response to SMS sender). In another specific implementation, the baseband radio includes a TCP/IP stack. In this specific implementation, the radio itself can communicate with a server to receive commands, validate commands, perform actions, and return responses.

As discussed above, in a specific implementation, the security program is pre-installed in the "/system" partition. It should be appreciated, however, that the security program or portions of the security program may be stored in any memory component where stored data persists after a wipe. The security program may be stored in a firmware partition/segment that is not erased during a data clear (e.g., Android system partition) or that is restored as part of a data clear. In other specific implementations, the security program may be stored on the SIM card, bootloader, baseband radio, or combinations of these.

In another specific implementation, the security program software initially authenticates with server in order to receive commands. In this specific implementation, raw username/password may be stored on the device. Instead or additionally, an authentication token provided by a server (e.g., such as that provided by Google or Apple's authentication systems) may be stored on the device. In this specific implementation, the client generates private key or certificate upon login and shares the public key with the server. Future communications can use the client's private key to authenticate (e.g., client SSL certificate). Alternatively, the server may generate a key and provide the key to the client. In this specific implementation, the system can be a single sign on system (e.g., logging into Google service on Android or an Apple account on iOS) or a single application's authentication scheme.

In another specific implementation, the security program software stores credentials on a device or registers identity for future reactivation. In a specific implementation, the stored credentials are directly stored on portion of device memory that is not erased during a data clear process (e.g., special writable partition). There can be a secure element (e.g., TPM, or portion of processor, e.g., TrustZone) used to generate (or receive from server) and store a private key or certificate described above, so that it is not accessible to ordinary applications. In this specific implementation, when logging into server, the secure element provides signed token or secure element used to sign credentials to be sent to server.

In this specific implementation, the client may modify a partition on embedded or removable memory (e.g., flash memory) to create an "unused" portion of memory where it may write directly to the memory in a way that is not overwritten on reset. For example, if a memory device contains a contiguous set of blocks for data storage, and a partition is set up to use all but the last 10 blocks for its operations, then it is possible for a client to write to a known portion in that card to store its credentials in a way that will not be overwritten if only the partition portion of the memory is erased.

The client may communicate with the baseband processor (e.g., sending specially crafted SMS message that is intercepted by baseband radio or directly sending AT commands to the radio) or SIM card (e.g., using sim toolkit commands) to store credentials for later retrieval. This mechanism can be secured by validating requests to store or retrieve credentials to a known public key. If only the server stores the key and the baseband radio or SIM card issues a challenge which must be digitally signed in order for a credential commit or retrieval to occur, such a system can prevent unauthorized access.

In another specific implementation, the server stores identity of device for reactivation. Authentication may proceed as above. An identity or identifier may be a device ID (IMEI/MEID) (International Mobile Equipment Identity) (Mobile Equipment Identifier), WiFi media access card (MAC) Address (devices with WiFi), Bluetooth (BT) MAC Address (devices with Bluetooth), central processing unit (CPU) or SoC (System on Chip) Serial Number, /sys/class/android_usb/android0/iSerial, Android ID (Settings.Secure.ANDROID_ID), ICCID (Integrated Circuit Card Identifier), subscriber identity module (SIM) serial number, SUBSCRIBER ID (MSI), phone number, other hardware identity (e.g., Unique Device Identifier (UDID)), or combinations of these. It can be important, however, to recognize that a jailbroken iOS device allows you to change the UDID and that Apple is deprecating the UDID. A similar case may also apply to Android devices and Windows Phone devices.

Jailbreaking refers to the process of overcoming limitations in a computer system or device that were implemented for reasons of security, administration, or marketing. Jailbreaking, also known as privilege escalation, can include exploiting a bug, design flaw or configuration oversight in an operating system or software application to gain elevated access to resources that are normally protected from an application or user. The result is that an application with more privileges than intended by the application developer or system administrator can perform unauthorized actions. Jailbreaking may be referred to as iOS jailbreaking in the context of an iOS device or Android rooting in the context of an Android device. In some cases, using MAC addresses can also be unreliable because they can be changed in software. In an implementation, multiple device identifiers (e.g., two or more different types of device identifiers) can be used to identify a device. Using multiple device identifiers can help to ensure accurate identification of the device.

Table B below lists and summarizes some attributes that may be used to identify a device.

TABLE B

| Attribute | Description and Characteristics |
| --- | --- |
| Device ID (IMEI/MEID) (International Mobile Equipment Identity) (Mobile Equipment Identifier) | E.g., "355428152547612" the device ID, the unique ID will persist across factory resets.<br>android.permission.READ_PHONE_STATE<br>CDMA devices which have an ESN instead of an IMEI.<br>Is set by device manufacturers and is usually also printed on the phone itself.<br>It can be used to lock down phones that have been reported stolen. It remains with the device forever. |
| WiFi MAC Address | E.g., "90:18:7C:D5:43:34"<br>android.permission.ACCESS_WIFI_STATE<br>unavailable when WiFi is off<br>not all devices have WiFi<br>WifiManager wm = (WifiManager)getSystemService(Context.WIFI_SERVICE);<br>String m_szWLANMAC = wm.getConnectionInfo( ).getMacAddress( );<br>Wireless MAC address is more unique than IMEI, because the later gets spoofed on stolen devices.<br>Drawback is that it only works on WiFi enabled devices. |
| BT MAC Address (devices with Bluetooth) | android.permission.BLUETOOTH<br>unavailable when BLUETOOTH is off<br>not all devices have BLUETOOTH<br>BluetoothAdapter m_BluetoothAdapter = null; // Local Bluetooth adapter<br>m_BluetoothAdapter = BluetoothAdapter.getDefaultAdapter( );<br>String m_szBTMAC = m_BluetoothAdapter.getAddress( ); |
| CPU or SoC (System on Chip) Serial Number | (e.g., for ARMv7 Processor rev 0 (v71): c0edaf4052f7490b/proc/cpuinfo<br>There is no unique number in the processor itself, this is an external component added by the SoC design if it exists at all. |

TABLE B-continued

| Attribute | Description and Characteristics |
|---|---|
| /sys/class/android_usb/android0/ iSerial | in an App with no permissions whatsoever. -rw-r--r--root root 42f680vc0defa49 Build.SERIAL is also available without any permissions, and is (in theory) a unique hardware serial number. e.g., "42f7490bc0edaf39" and dev id e.g., "ee23289e6961bach" |
| ICCID | The ICCID (Integrated Circuit Card Identifier) identifies each SIM internationally. A full ICCID is 19 or 20 characters. It is possible to extract the ICCID by using the "AT!ICCID?" modem command. The format of the ICCID is: "MMCC IINN NNNN NNNN NN C x" |
| SIM SERIAL NO | E.g., "8901412275892533745" |
| SUBSCRIBER ID (MSI) | E.g., "310410589253374" getSubscriberId( ) Returns the unique subscriber ID, for example, the IMSI for a GSM phone. IMSI (International Mobile Subscriber Identity) is stored as a 64-bit field and is sent by the phone to the network. An IMSI is usually presented as a 15-digit long number, but can be shorter. The IMSI conforms to the ITU E.212 numbering standard. |
| Android ID | E.g., "ee26189e7971bacb" All devices with a Google account added returned a value for ANDROID_ID Settings.Secure.ANDROID_ID It is not 100 percent reliable on releases of Android prior to 2.2 ("Froyo"). Also, there has been at least one widely-observed bug in a popular handset from a major manufacturer, . . . where every instance has the same ANDROID_ID. A 64-bit number (as a hex string) that is randomly generated on the device's first boot . . . and should remain constant for the lifetime of the device. . . . (The value may change if a factory reset is performed on the device.) This string can also be altered on a rooted phone. |
| Google Service Framework (GSF ID KEY) | E.g., "33c7805eb65e2339," or "3b945fd7ac0319b7" |

In order to address the problem of another device attempting to spoof the identity, there may be an identity having a private key associated with it (e.g., embedded in a secure element) so that it is not possible for another device to impersonate that identity. Alternatively, the identity can be validated by a network operation (e.g., transmission or receipt of an SMS message), header enrichment performed by network infrastructure or other validation performed by network infrastructure.

In another specific implementation, after a data clear, the security software reauthenticates based on identity or stored credentials. For reauthenticating using identity, the security software can provide identity to the server and the server can provide new credentials to client. For reauthenticating using stored credentials, the security software may first check to see if stored credentials exist on a device, and if they do retrieve stored credentials from the device and reauthenticate with the server. Reauthenticating may include directly reading credentials from an SD card, searching in unpartitioned space in non-volatile memory, retrieving credentials from secure element, baseband processor, or SIM card, or combinations of these.

In another specific implementation, there is an alternative to reauthenticating based on stored credentials. In this specific implementation, the security software leaves behind a component that can provide agency after data clear operation. Provisioning may include installing an application on the baseband processor or on SIM and activating the application on baseband processor or on SIM by provisioning it with authentication credentials. Agency may refer to remote access commands (e.g., locate, disable, or lock), install other applications, bootstrap authentication of other services (e.g. reactivate a security or missing device app with credentials), or combinations of these.

In a specific implementation, a storage or memory component of the mobile communications device includes a first partition and a second partition, different from the first partition. The first partition stores user data such as a user's contacts, settings, messages (e.g., text messages or e-mail messages), applications that the user has downloaded and installed on the device, and the like. The second partition stores the security program and operating system files, system BIOS, ROM BIOS, or the like. A size (e.g., megabyte size) of the first partition may be different than a size of the second partition. In a specific implementation, the size of the first partition is greater than the size of the second partition. That is, the size of the second partition is less than the size of the first partition. This provides the user with a large space in which to store their data. In another implementation, the size of the first partition may be less than the size of the second partition. The first partition may be associated with a first range of memory addresses. The second partition may be associated with a second range of memory addresses, different from the first range of memory addresses.

As discussed above, in a specific implementation, the security program is pre-loaded or pre-installed on the device. That is, the security program may be installed on the device before the device is provided (e.g., sold) to a user. The security program may be installed as part of a manufacturing step such as by the factory, manufacturer, or wireless network operator. The security program may be installed in the second partition before any user-specific data is installed in the first partition. The security program may be installed before the device is activated. In some cases, the security program may be integrated with the device operating system. Alternatively, the security program may be separate from the device operating system, but both the operating system and the security program may be installed on the same internal memory partition.

The security program may be installed before, after, or with the device operating system. The security program may be installed during the device manufacturing process, i.e., as a step in the device manufacturing process. The security program may be installed before the device is fully assembled. For example, the security program may be installed on a memory component and after the security program is installed on the memory component, the memory component may be inserted into a housing of the device. Alternatively, the security program may be installed after the device is fully assembled.

An advantage of pre-loading the security program is that the user can enjoy the features offered by the security program without having to "root" the device. As discussed above, rooting refers to a process where a user obtains superuser or administrator rights or permissions to the files and programs in the software operating system, e.g., access to the system partition. Typically, a device manufacturer, carrier, or both provide users with "guest" privileges. This is done to help protect users from corrupting, modifying, or deleting critical system files, help facilitate device updates, prevent users from installing unauthorized applications, and the like. Circumventing device restrictions or "rooting" may be prohibited through end-user agreements, may void the device warranty, and in some cases may even be illegal. "Rooting" a device may cause the device to become unstable or disable some or all device features (e.g., "brick" the device).

Figure 3B:
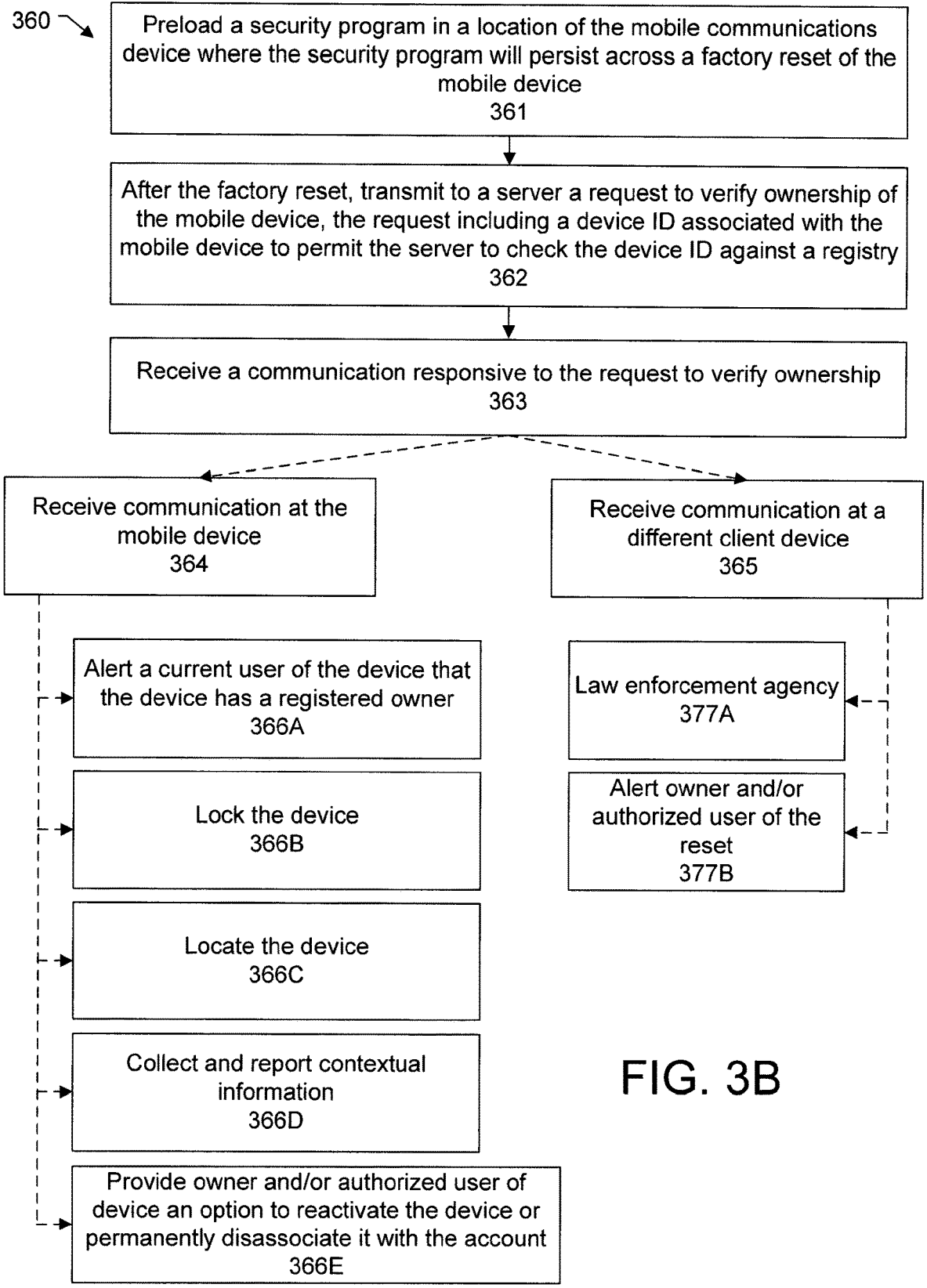
FIG. 3B shows a flow of a specific implementation of the security application program.

FIG. 3B shows a flow 360 of a specific implementation for a pre-loaded security program on a mobile communications device. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

A specific implementation of the persistent security mechanism provides for a preloaded app and reactivation via server using a device ID (or other form of stored identity). In this specific implementation, the software, i.e., preloaded security app, persists across a factory reset. The software either consults a server or retrieves information stored in memory that survives the factory reset to determine if security software on the device should "activate" (i.e., attach to an existing account). In one embodiment this relates to the timing of a device being reported as stolen relative to the occurrence of a factory reset. If the device is reported stolen before there is a factory reset, the security app would have received an indication to that effect from the server, and it can store an indication in a file in the system partition or other memory location that will survive a factory reset indicating that the device has been reported stolen. If there is a subsequent factory reset, this file survives, and the security app can know that the device is stolen without consulting the server.

In this specific implementation, in the event that the factory reset occurred before the device had been reported stolen, or before the indication that the device was stolen had been received at the device from the server, then there would be no such file on the device for the security app to inspect.

In another embodiment, there is a file that the security app inspects; this file can contain a unique identifier that was assigned to this device when the device was first registered with the server. The unique identifier can involve a computation or hash of other properties or identifiers of the device and can be performed at the device and then the results sent to the server; or the unique identifier can be generated by the server and communicated to the device. In this instance, the unique identifier so generated and assigned is used to perform queries about whether the device is stolen or not. In a variation additional information is stored in the file, including the timestamp of the last time the security app successfully connected to the server, and what was the stolen/not-stolen state of the device at that time.

The security app can be required by policy to communicate with the server regularly even if there has been no factory reset; a configurable amount of time since the last successful communication can be used to determine when the security app makes a connection. In a variation, according to a policy setting, the security app can consider the device as being "stolen" if a configurable amount of time has elapsed with no successful communication with the server, as indicated by the value in the file. For example, the frequency of communication check-ins with the server can be configured as once an hour, once a day, once every other day, once a week, and so forth. A user who is very security conscious may configure more frequent check-ins and be willing to accept accompanying data usage charges as compared to a user who is less security conscious. In a variation, the entire contents of this file are protected via encryption and/or being digitally signed by the server.

The server may optionally ask the owner of the account if they wish to reactivate the device or permanently disassociate it with the account (e.g., to allow a user to relinquish control over it in the case of selling a used phone).

Referring now to FIG. 3B, in a step 361, a security application program is pre-loaded in a location of a mobile communications device where the security program will persist across (e.g., survive) a factory reset of the mobile device. In a specific implementation, the security program is pre-loaded in a system partition of the mobile device.

In a step 362, after the factory reset, the security program—having survived—the factory reset, transmits to a server a request to verify ownership of the mobile device. The request may be transmitted as soon as the device boots, i.e., upon boot. Booting (also known as booting up) is the initial set of operations that a computer system performs when electrical power to the CPU is switched on. The process begins when a computer is turned on for the first time or is re-energized after being turned off, and ends when the computer is ready to perform its normal operations. Booting typically involves performing a power-on self-test, locating and initializing peripheral devices, and then finding, loading and starting an operating system. Booting may be initiated by a software command without cycling power, in what is known as a soft reboot. Some of the initial operations might be skipped on a soft reboot. A boot loader is a computer program that loads the main operating system or runtime environment for the computer after completion of the self-tests.

Generally, the boot process begins with the execution of an initial program stored in boot ROMs or read in another fashion. The initial program may be a boot loader that may then load into random-access memory (RAM), from non-volatile secondary storage (such as a hard disk drive or flash memory).

In a specific implementation, the request to verify ownership of the mobile device is an operation that is transmitted during the booting process. The request may be transmitted during a soft boot or a hard boot. More specifically, in an Android device the request may be transmitted before the intent "ACTION_BOOT_COMPLETED" is broadcast. In another specific implementation, the request is transmitted after booting has completed. For example, in an Android device the request may be transmitted after the intent "ACTION_BOOT_COMPLETED" is broadcast.

The request includes a device ID associated with the mobile device to permit the server to check the device ID against a registry and determine the device status (e.g., OK or STOLEN). The device ID may include an IMEI/MEID (International Mobile Equipment Identity) (Mobile Equipment Identifier), iFi MAC Address (devices with WiFi), BT MAC Address (devices with Bluetooth), CPU or SoC (System on Chip) Serial Number, /sys/class/android_usb/android0/iSerial, Android ID (Settings.Secure.ANDROID_ID), or combinations of these. In a specific implementation, the security program survives the factory reset because it is stored in the system partition (or other location where data is not cleared during the reset).

As discussed in this patent application, the registry (see FIG. 14) stores a database that correlates the device ID of the device to authorized users such as the device owner. The registry further stores a status of the device such as whether the device has been reported missing or stolen.

In a step 363, a communication responsive to the request to verify ownership is received from the server. A communication may be referred to as an instruction, command, notification, or alert. The communication may be received at the mobile device (step 364), at a different client device (step 365), or at the mobile device and the other client device. The communication received at the mobile device and the communication received at other client device may be the same or different.

The content of the communication depends on the result of the server's check of the device ID against the registry. For example, if the mobile device was reported as stolen the communication may include a command to lock the mobile device, an alert to inform the current user of the device that the device has a registered user, or both. Alternatively, as discussed below, there may be legitimate reasons for the device being reset such as the owner wishing to sell the device or attempting to fix a problem with the device.

More particularly, in an implementation, a communication 366A includes alerting a current user of the mobile device that the device has a registered user. For example, a message may be displayed on a screen of the device so as to notify the current user that the device has a registered user. The message may include directions for the current user to follow in order to return the device to the registered user. For example, the current user may be directed to turn the device in to a police station. The message may include an address supplied by the registered user for where the device is to be returned. For example, the registered user may supply their work address, home address, or both. The address may be supplied as part of the registration process for the mobile device. Instead or additionally, the address may be supplied upon the registered user submitting a report that the device is missing or was stolen. In some cases, the registered user may not want to have their home or work address displayed as part of the alert such as in cases of theft. The system allows the registered user to configure whether or not the address displayed.

A communication 366B includes a command to the security program to lock the device. Locking the device can include disabling some or all the features of the device. For example, when the device is locked, the unauthorized user may be presented with a lock screen that requires a password to remove.

A communication 366C includes a command for the device to determine and track its geographical location. The geographical location may be transmitted to the server so that the device can be located.

A communication 366D includes a command for the device to collect and report contextual information. The information can be used to help ensure for the device's return and that any criminals who participated in the device's theft are prosecuted. Contextual information can include sensor readings, photographs, audio, video, or nearby WiFi base stations or cell towers from the device, or combinations of these. For example, a microphone of the device may be activated in order to collect audio data. The one or more cameras of the device may be activated in order to record video, capture still images, or both. Identifiers associated with WiFi base stations, cell towers, or both that are within range of the device may be collected. The contextual information can be sent to the server and relayed to the owner, authorized user, law enforcement agencies, other authorized entities, or combinations of these.

A communication 366E includes providing an owner or authorized user of the device with an option to reactivate the device or permanently disassociate it with the account (e.g., to allow the user to relinquish control over it in the case of selling a used phone). For example, in some cases an owner or authorized user may wish to reset the device if they are experiencing problems with the device. Resetting the device may be used to help address issues such as memory leaks, frequent operating system crashes, general sluggishness, and the like. In other cases, an owner or authorized user may wish to reset the device before selling or otherwise transferring ownership of the device. Providing the user with an option to reactivate the device and an option to disassociate it with the account ensures that the registry remains up-to-date.

Referring now to step 365, a communication may instead or additionally be received at a different client device. For example, the owner or authorized user may specify an email address, text message phone number, or both to which a communication should be sent upon a factory reset of the device. The owner or authorized user may specify multiple recipients. For example, the owner or authorized user may specify a law enforcement agency, relatives, friends, spouse, or partner as recipients. The owner or authorized user of the mobile device may specify a recipient when registering the mobile device. Alternatively, the owner or authorized user may specify a recipient after the device has been registered. For example, the owner or authorized user may specify a recipient when submitting a report that the device is missing or has been stolen.

For example, a communication 377A may be received by a law enforcement agency. A communication 377B may be received at an email address, phone number, or both as specified by the owner or authorized user, or at a server acting as an intermediary for communication with a law enforcement agency. A communication may include information to help assist in the recovery of the device. For example, a communication may include location data (e.g., time-stamped GPS coordinates that track and identify a location of the device), contextual data (e.g., photographs, video, or both of the area in which the device is in, voice recordings captured by the device microphone), browsing history, usage logs, activity logs, or combinations of these.

Figure 3C:
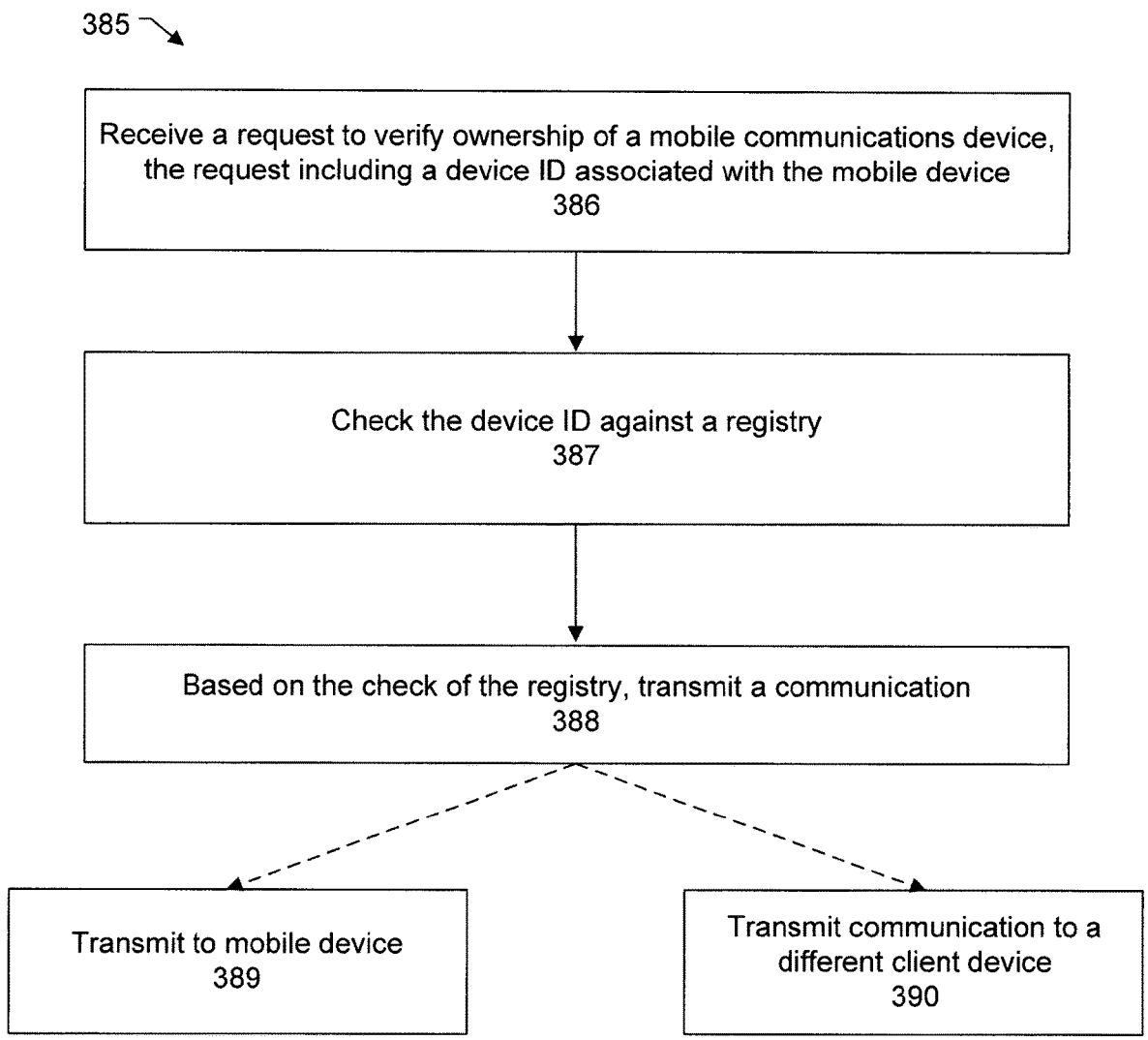
FIG. 3C shows a flow of another specific implementation.

FIG. 3C shows a flow 385 of another specific implementation of a persistent security mechanism. In a step 386, the server receives from the mobile device a request to verify ownership (e.g., authorized use) of the device. The request includes the device ID associated with the mobile device. As discussed above, such a request may be triggered by the factory reset of the device (see step 362—FIG. 3B). In a step 387, the server checks the device ID against a registry to determine the device status (e.g., "OK," or "STOLEN"). Further discussion of the registry is provided below. In a step 388, based on the check of the registry, the server transmits a communication to the mobile device (step 389), transmits a communication to a different client device (step 390), or both. The different types of communications are shown in FIG. 3B and described in the discussion accompanying FIG. 3B and elsewhere in this patent application.

In a specific implementation, the server provides a set of services to help coordinate efforts among law enforcement, the device owner, authorized device users, carriers, and others to help ensure for the safe recovery of a stolen device and the prosecution of those responsible or involved in the theft. For example, the server may receive a request from the law enforcement agency to send a response to the security program on the mobile device directing the security program to locate the device, send a set of contextual information (e.g., sensor readings, photographs, audio, video, nearby WiFi base stations or cell towers, or combinations of these. The server may send a notification to a carrier to which the mobile device is currently associated with that informs the carrier that the device as been reported as missing or stolen and has communicated with the server.

FIG. 4 shows a flow 405 of another specific implementation of a pre-loaded security program on a mobile communications device. In a step 410, a security program is provided to a system builder (e.g., device manufacturer or carrier) for the system builder to install the security program in a first memory partition of a mobile communications device. That is, the application program is provided so that the system builder can pre-install or pre-load the security program onto the mobile device before the mobile device is sold to an end user. The application program may be provided to the system builder on computer readable media such as a DVD, made available for download on web page, via FTP (File Transfer Protocol), emailed, or combinations of these.

In a specific implementation, the security application to be pre-loaded is formatted as an Android application package file (APK). The Android application package file is the file format used to distribute and install application software and middleware onto the Android operating system as provided by Google. To make an APK file, a program for Android is first compiled, and then all of its parts are packaged into one file. An APK file includes the program code (such as .dex files), resources, assets, certificates, and manifest file. APK files can have any name as desired, provided that the file name ends in ".apk."APK files can be ZIP file formatted packages based on the JAR file format, with .apk file extensions. The MIME type associated with APK files is "application/vnd.android.package-archive."

In this specific implementation, the system builder places the APK into the /system partition, into the/system/app folder. Ordinary apps will be located on the/data partition which is read-write. Thus, these applications can be updated by a system. The apps are placed into the system build, which is placed on the device. Generally, an entire Android system can be flashed in a single command: this writes the boot, recovery and system partitions together after verifying that the system being flashed is compatible with the installed bootloader and radio, and reboots the system. This also erases all the user data, similarly to fastboot oem unlock mentioned earlier. Thus, the entire system image may be built first (including the "preload apps") and then this may be "flashed" onto the target device.

In this specific implementation, the OS marks the security application program or app as having extra permissions, the "signatureOrSystem" protection level permissions. The "signatureOrSystem" is a permission that the system grants only to applications that are in the Android system image or that are signed with the same certificate as the application that declared the permission. These permissions are not available to ordinary apps. In this specific implementation, the security program APK is a "system app." The app can subsequently be updated such as via the Google Play store, but because it has the same signer and APK name as the one in the system folder, the update will run as a preload or system app with those special privileges. Typically, pre-loaded apps cannot be removed by the user unless the user has root privileges on the device (e.g., user has rooted their device).

Table C below shows examples of the "systemOrSignature" permissions android.permission.ACCESS_CACHE_FILESYSTEM - 18
android.permission.ACCESS_CHECKIN_PROPERTIES - 18
android.permission.ACCESS_DOWNLOAD_MANAGER - 18
android.permission.ACCESS_DOWNLOAD_MANAGER_ADVANCED - 18
android.permission.ACCESS_MTP - 18
android.permission.ALLOW_ANY_CODEC_FOR_PLAYBACK - 18
android.permission.BACKUP - 18

Table C below shows examples of the "systemOrSignature" permissions android.permission.BIND_APPWIDGET - 18
android.permission.BIND_DIRECTORY_SEARCH - 18
android.permission.BIND_KEYGUARD_APPWIDGET - 18
android.permission.BIND_REMOTEVIEWS - 18
android.permission.BIND_WALLPAPER - 18
android.permission.CALL_PRIVILEGED - 18
android.permission.CHANGE_COMPONENT_ENABLED_STATE - 18
android.permission.CHANGE_CONFIGURATION - 18
android.permission.CONNECTIVITY_INTERNAL - 18
android.permission.CONTROL_LOCATION_UPDATES - 18
android.permission.CRYPT_KEEPER - 18
android.permission.DELETE_CACHE_FILES - 18
android.permission.DELETE_PACKAGES - 18
android.permission.DOWNLOAD_CACHE_NON_PURGEABLE - 18
android.permission.GLOBAL_SEARCH - 18
android.permission.INSTALL_LOCATION_PROVIDER - 18
android.permission.INSTALL_PACKAGES - 18
android.permission.MANAGE_USB - 18
android.permission.MANAGE_USERS - 18
android.permission.MASTER_CLEAR - 18
android.permission.MODIFY_APPWIDGET_BIND_PERMISSIONS - 18
android.permission.MODIFY_NETWORK_ACCOUNTING - 18
android.permission.MODIFY_PHONE_STATE - 18
android.permission.MOUNT_FORMAT_FILESYSTEMS - 18
android.permission.MOUNT_UNMOUNT_FILESYSTEMS - 18
android.permission.MOVE_PACKAGE - 18
android.permission.PACKAGE_USAGE_STATS - 18
android.permission.PACKAGE_VERIFICATION_AGENT - 18
android.permission.PERFORM_CDMA_PROVISIONING - 18
android.permission.READ_FRAME_BUFFER - 18
android.permission.READ_NETWORK_USAGE_HISTORY - 18
android.permission.READ_PRIVILEGED_PHONE_STATE - 18
android.permission.REBOOT - 18
android.permission.RECEIVE_DATA_ACTIVITY_CHANGE - 18
android.permission.RECEIVE_EMERGENCY_BROADCAST - 18
android.permission.RETRIEVE_WINDOW_CONTENT - 18
android.permission.SEND_SMS_NO_CONFIRMATION - 18
android.permission.SERIAL_PORT - 18
android.permission.SET_TIME - 18
android.permission.SET_WALLPAPER_COMPONENT - 18
android.permission.SHUTDOWN - 18
android.permission.STATUS_BAR - 18
android.permission.STOP_APP_SWITCHES - 18
android.permission.UPDATE_DEVICE_STATS - 18
android.permission.UPDATE_LOCK - 18
android.permission. WRITE_APN_SETTINGS - 18
android.permission. WRITE_GSERVICES - 18
android.permission. WRITE_MEDIA_STORAGE - 18
com.android.chrome.TOS_ACKED - 18
com.android.launcher.permission.PRELOAD_WORKSPACE - 18
com.android.vending.TOS_ACKED - 18
com.android.vending.billing.ADD_CREDIT_CARD - 18
com.android.vending.billing.BILLING_ACCOUNT_SERVICE - 18
com.google.android.c2dm.permission.SEND - 18
com.google.android.gallery3d.permission.GALLERY_PROVIDER - 18
com.google.android.gtalkservice.permission.SEND_HEARTBEAT - 18
com.google.android.partnersetup.permission.UPDATE_CLIENT_ID - 18
com.google.android.permission.BROADCAST_DATA_MESSAGE - 18
com.google.android.providers.gsf.permission.WRITE_GSERVICES - 18
com.google.android.xmpp.permission.BROADCAST - 18
com.google.android.xmpp.permission.XMPP_ENDPOINT_BROADCAST - 18

It should be appreciated, however, that techniques for a pre-loaded security program can apply to other operating systems such as iOS as provided by Apple, Windows Phone 8 by Microsoft, and others.

Figure 6:
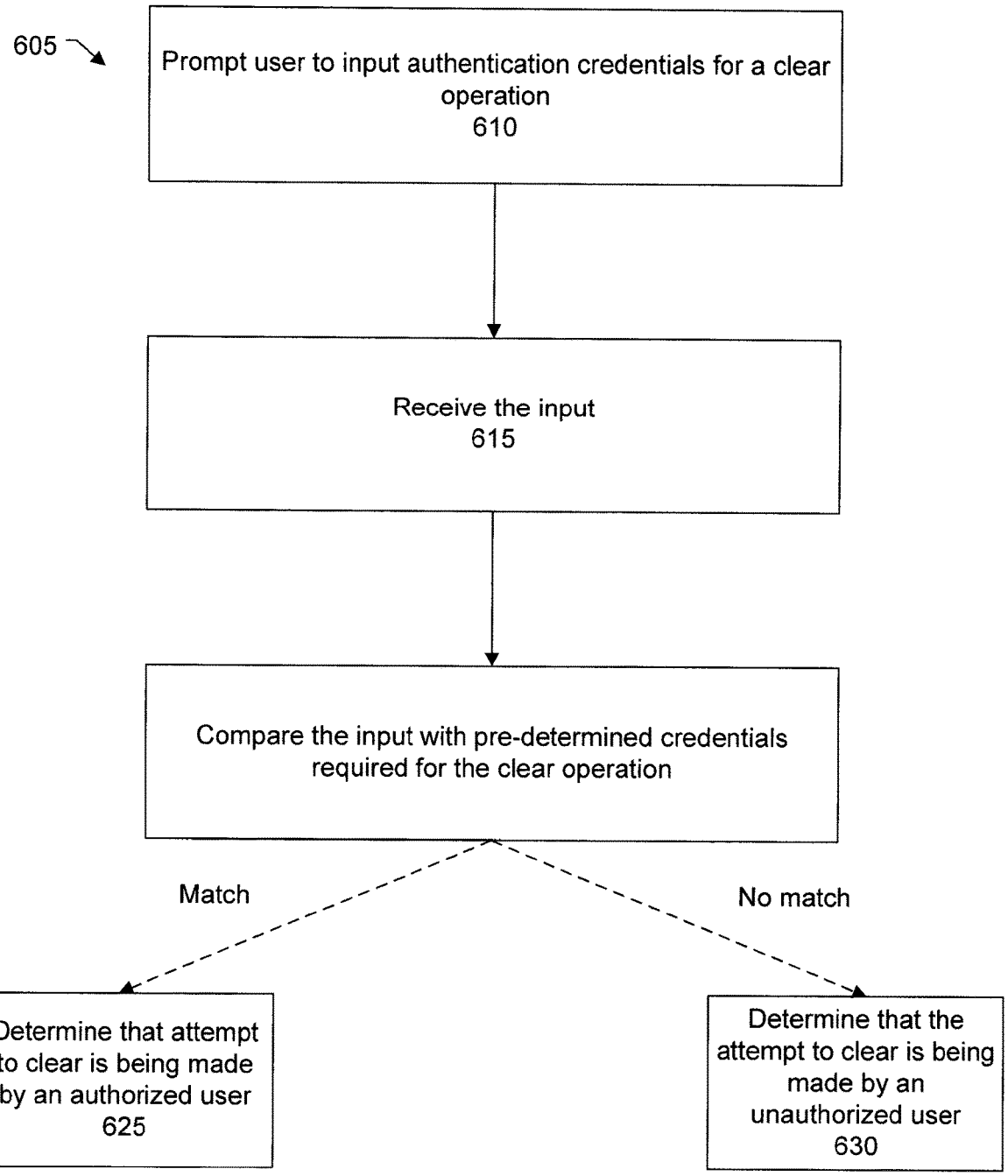
FIG. 6 shows a flow of a specific implementation for determining whether a user is authorized to clear the mobile communications device.
Figure 7:
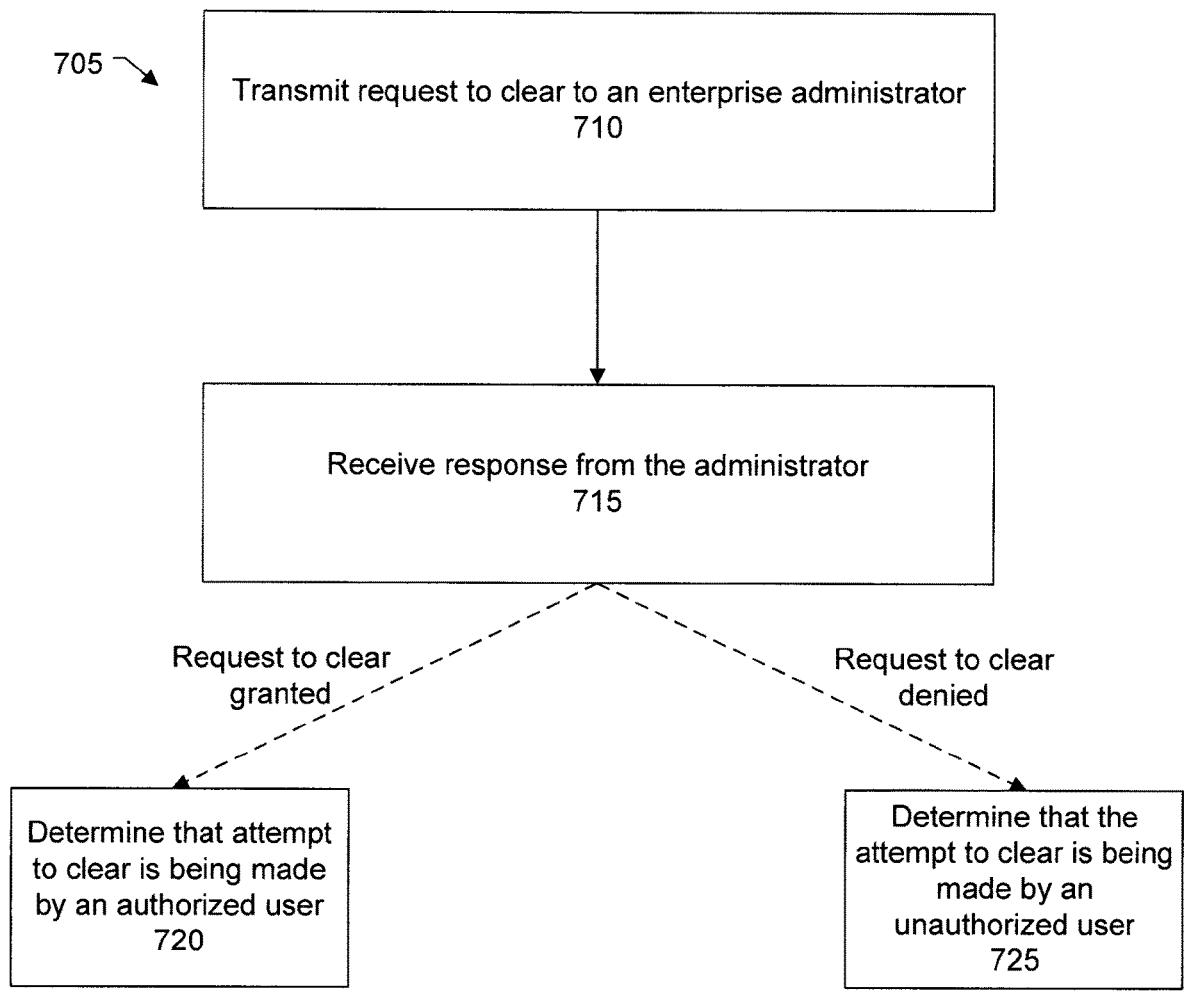
FIG. 7 shows a flow of another specific implementation for determining whether a user is authorized to clear the mobile communications device.
Figure 8:
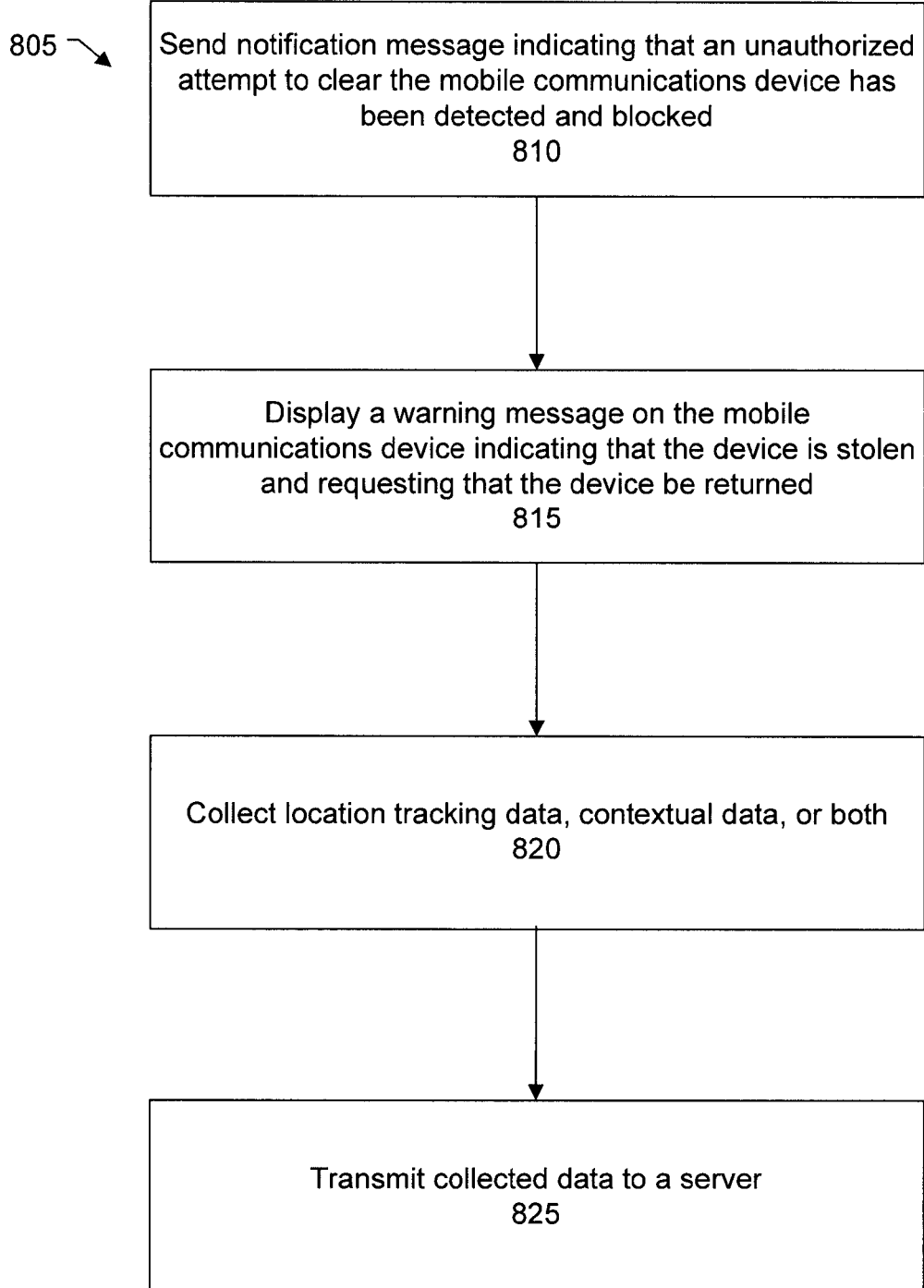
FIG. 8 shows a flow of a specific implementation for generating an alert.
Figure 9:
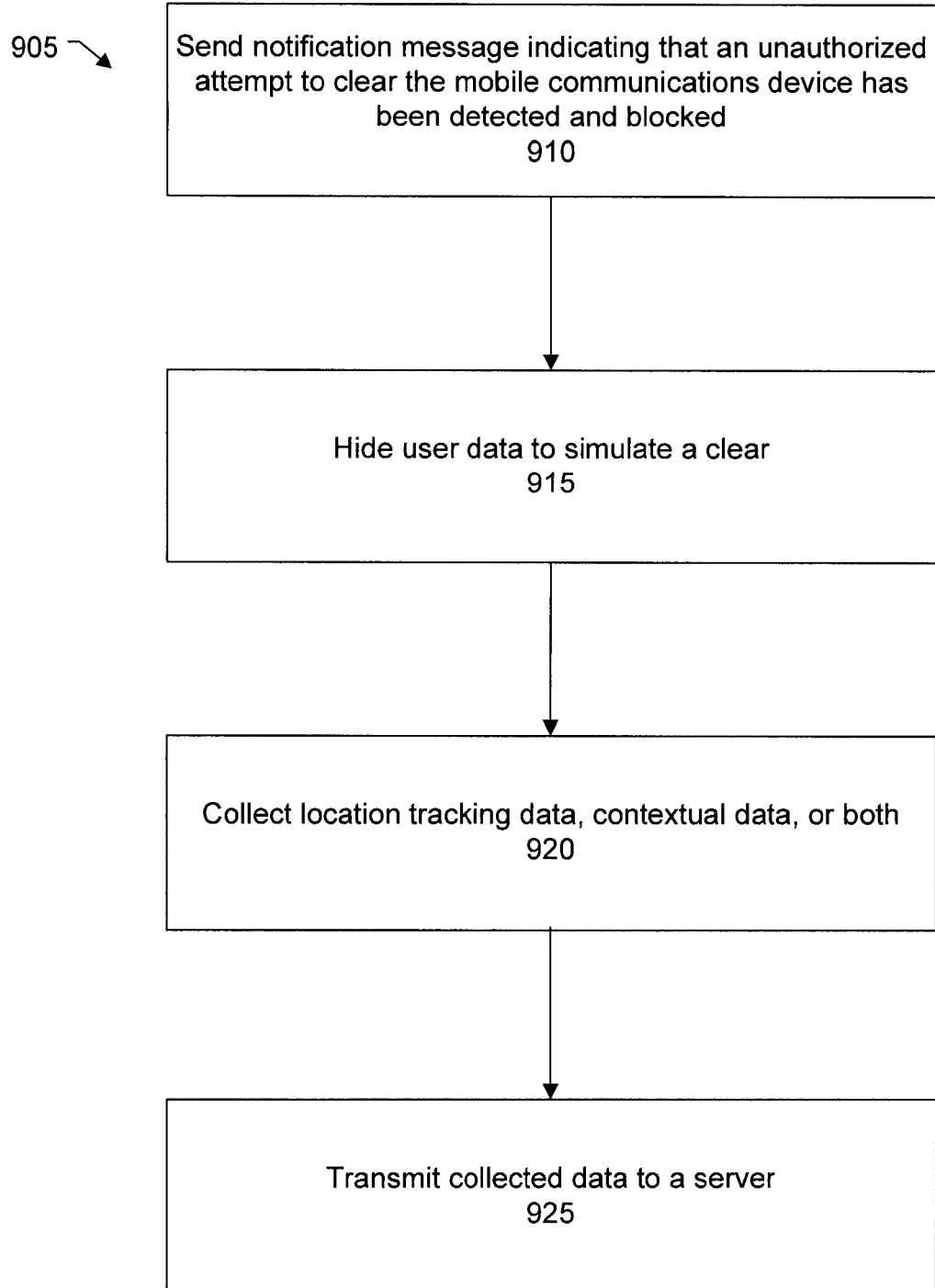
FIG. 9 shows a flow of a specific implementation for generating a silent alert.
Figure 15:
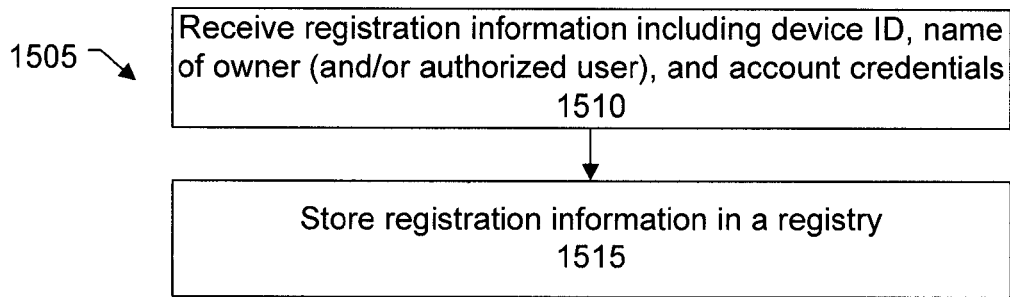
FIG. 15 shows a flow of a specific implementation for registering the mobile device.

In a step 415, a first user is registered as being an owner or authorized user of the mobile communications device. Registering users may be as shown in FIG. 15 and described in the discussion accompanying FIG. 15. In a step 420, the security program intercepts an attempt to clear all user data stored in a second memory partition of the mobile communications device, different from the first memory partition. In a specific implementation, the first memory partition includes a system partition, and the second memory partition includes a user data partition. In a step 425, a determination is made that the attempt was by an unauthorized second user who is not registered as an owner or authorized user of the mobile device. The determination may be as shown in FIGS. 6 and 7 and described in the discussion accompanying FIGS. 6 and 7. In a step 430, upon the determination, an alert is generated. Generating an alert may be as shown in FIGS. 8 and 9 and described in the discussion accompanying FIGS. 8 and 9.

Figure 5:
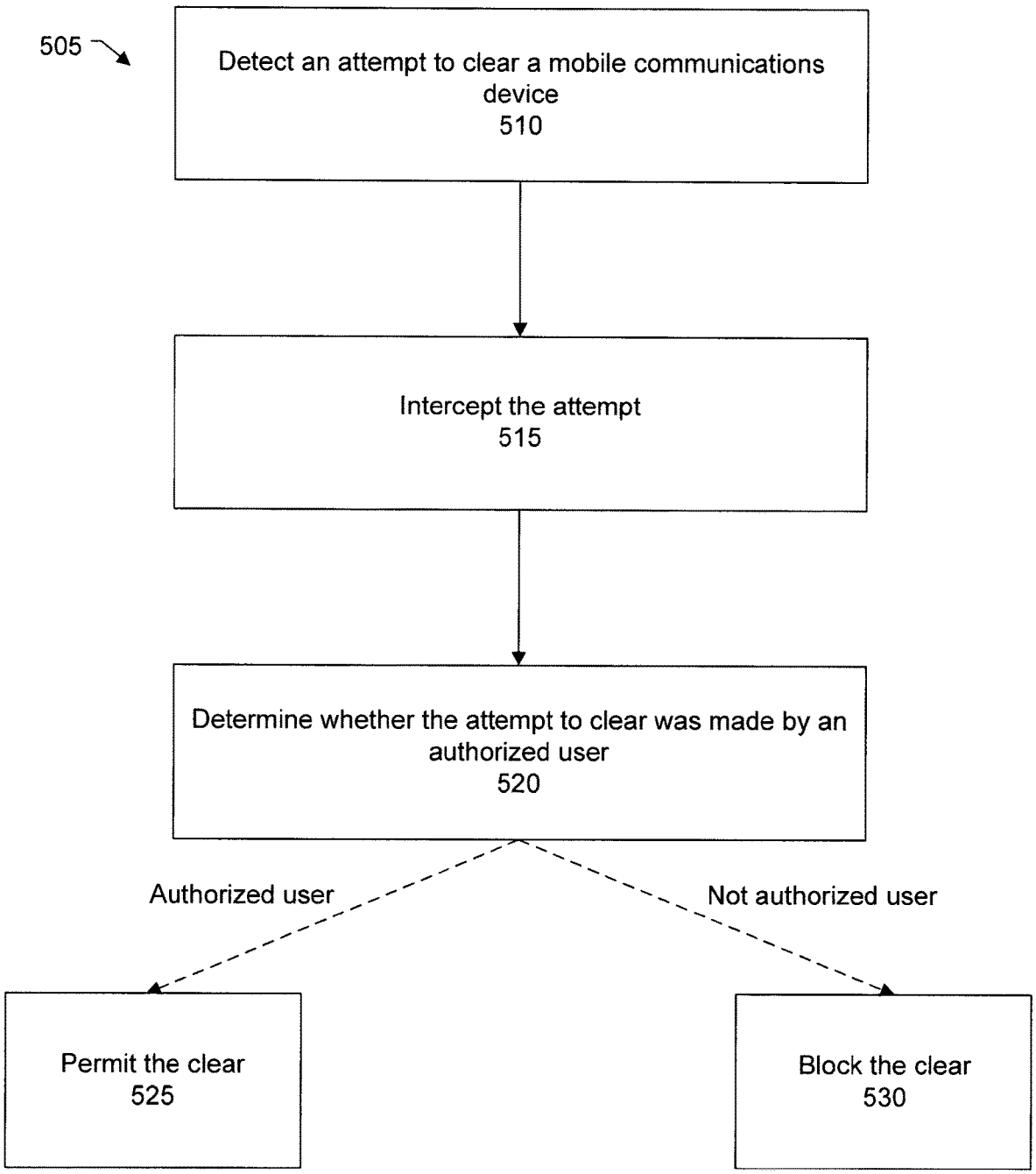
FIG. 5 shows a flow of a specific implementation of the security application program in use.

FIG. 5 shows a flow 505 of a specific implementation for determining whether an attempt to clear a mobile communication device should be allowed. In brief, in a step 510, a security program, pre-loaded into a system partition of the device, detects an attempt, action, or operation to clear the device. In a step 515, the security program intercepts the attempt. In a step 520, a determination is made as to whether the attempt to clear is being made by a user authorized to clear the device. If the user is authorized, the clear operation is permitted (step 525). If the user is not authorized, the clear operation is blocked (step 530).

The processing to determine whether the user is authorized to clear the device (step 520) may be performed at the mobile communication device. Alternatively, the determination may be delegated to a server. That is, a request for the determination may be transmitted across the network to the server. In some cases, it will be desirable to perform the processing at the server because mobile communication devices are typically powered by a battery and have less computing resources (e.g., processing power, or storage) than a server. Performing processing at the server can help to conserve the limited resources on a mobile device. In other cases, it will be desirable to perform the processing at the mobile device because such processing will not require traversing a network and experiencing network delays. Alternatively, the user may be in a location where the network is unavailable.

FIG. 6 shows a flow 605 of a specific implementation for determining whether the attempt to clear is being made by an authorized user (step 520—FIG. 5). In a step 610, after intercepting the clear operation, the user or current user is prompted to input authentication credentials. The authentication credentials may include a password (e.g., pass phrase, personal identification number (PIN), or challenge response), security token, a biometric identifier, or combinations of these (e.g., two-factor authentication).

The authentication credentials may be pre-determined or pre-defined. More particularly, the authentication credentials may have been set by the device owner or authorized user as part of a configuration process such as when activating the device. For example, when the device owner or authorized user first turns on the device, a security setup wizard may be launched that guides the owner or authorized user through the process of establishing authentication credentials in the event that the owner or authorized user wishes to clear the device. For example, the owner or authorized user may wish to clear the device when selling the device to another, disposing the device, and so forth. The authentication credentials may be encrypted and stored at the device, server, or both. The authentication credentials may be different from a passcode used to unlock the device for use. Requiring authorization credentials to clear the device provides an extra layer of security than the passcode alone.

In a step 615, the inputted authentication credentials are received at the mobile device. In a step 620, the inputted authorization credentials are compared with the pre-determined authorization credentials. In a specific implementation, the comparison is performed at the mobile device. In another specific implementation, the inputted authorization credentials are transmitted to the server and the comparison is at the server.

In a step 625, if the inputted authorization credentials match the pre-determined credentials a determination is made that the attempt to clear the device is being made by an authorized user (e.g., device owner). Alternatively, in a step 630, if the inputted authorization credentials do not match the pre-determined credentials a determination is made that the attempt to clear the device is being made by an unauthorized user (e.g., thief). The determination may be at the mobile device or the server.

FIG. 7 shows a flow 705 of another specific implementation for determining whether the attempt to clear the device is being made by an authorized user (step 520—FIG. 5). In a step 710, after the attempt to clear the device is intercepted, a request for permission to clear is generated and transmitted from the mobile device to an enterprise administrator. The request may be transmitted via an email, text message (e.g., Short Message Service (SMS) text message), other form of communication, or combinations of these. Table D below shows an example of some of the information that may be included in a request.

TABLE D

| To | administrator@ABCtech.com |
|---|---|
| From | security_on_behalf_of_rjones@ABCtech.com |
| Subject | Request for permission to clear mobile device |
| Body | User Ron Jones from the marketing department is requesting permission to clear his mobile device. To grant the permission, reply to this email with the word "GRANTED" in the subject line. To deny the permission, reply to this email with the word "DENIED" in the subject line. |

Table D shows an example of the request formatted as an e-mail. There is a "To" field, "From" field, "Subject" field, and a "Body" field. The "To" field identifies the administrator that will grant or deny the request to clear the device. The "From" field identifies the sender of the request. The "Subject" field identifies the type of the request. The "Body" field includes the detail of the request (e.g., name of person requesting the clear, and department person belongs to) and instructions on how to grant or deny the request. There can be additional fields such as a comment or explanation field for the administrator to explain to the user why the request to clear is being granted or denied.

In a step 715, the response from the administrator regarding the request to clear is received at the device. The security program can review the response and, based on the administrator's response, determine that the attempt is being made by an authorized user (step 720) or is being made by an unauthorized user (step 725). If the clear is being made by an authorized user, the attempt to clear may be permitted. If the clear is being made by an unauthorized user, the attempt to clear may be blocked. For example, if the administrator responds with a "GRANT" the security program can determine that the user is authorized. Alternatively, if the administrator responds with a "DENY" the security program can determine that the user is unauthorized.

Notifying a network administrator of an attempt to clear the device can helps administrators manage, control, and monitor the mobile devices that belong to the enterprise. Indeed, in some cases an administrator may not want the users (e.g., employees) to be clearing their devices—even if the employee is authorized to use the device—because the enterprise may desire to specify particular configurations (e.g., software configuration) of the mobile devices. For example, the enterprise may not want its employees to be installing software on the mobile that has not been approved by the IT department, deleting software that has been approved (and mandated) by the IT department, changing configuration settings (e.g., changing firewall settings), and the like.

FIG. 8 shows a flow 805 of a specific implementation of generating an alert to notify a user such as the device owner or authorized user of an unauthorized attempt to clear the device. In a step 810, a notification is sent to the device owner or authorized user, other pre-determined entity, or both indicating that an unauthorized attempt to clear the device has been intercepted and blocked. The notification may include an e-mail message, text message or both. For example, when configuring the security program the device owner or authorized user may specify an e-mail address for e-mail alert notifications. Instead or additionally, the device owner or authorized user may specify a phone number for text message alert notifications.

In a step 815, the security program displays a message on the device screen indicating that the device is stolen and requesting that the device be returned. For example, the message may include the text, "Your attempt to clear this device has been blocked because you are not the owner or authorized user of this device. Please return this device to the nearest police station." or "This device has been reported stolen. The device owner has been notified. Please call (555) 555-1234 to arrange for the return of this device." or the like. The message may be accompanied by audio such as sounds (e.g., beeps), speech, or both.

In a step 820, the security program may begin to collect location tracking data, contextual data, or both. Location tracking data may include GPS coordinates (e.g., latitude and longitude), access point identifiers, cell tower identifiers, altitude, direction of travel, time the location data was recorded, speed of travel, or combinations of these. Contextual data about the environment that the device is in may include photos, images, video, audio, nearby Wi-Fi or Bluetooth or cell tower identifiers, or combinations of these. This information can be used to help recover the device and prosecute the thief who stole the device.

In a specific implementation, the collecting of the data is performed as part of a stolen mode feature of the security program. In this specific implementation, upon determining that the current user is not authorized to clear the device, the security program can cause the device to enter a stolen mode. During the stolen mode, location tracking data may be collected, contextual information may be collected, certain features of the device may be disabled (e.g., ability to make international calls disabled), or combinations of these.

In a step 825, the collected data is transmitted from the mobile device to a server, device administrator, pre-specified network destination or combinations of these. For example, during a configuration process of the security program, the owner or authorized user may provide an e-mail address for the e-mailing of the collected data. The owner or authorized user can then provide the collected data to the police for assistance in recovering the mobile device. The collected data may instead or additionally be provided to the server. The owner or authorized user can then log onto the server through a web browser application in order to view the collected data.

FIG. 9 shows a flow 905 of another specific implementation of generating an alert. In this specific implementation, the alert may be a silent alert. This type of alert can inform the device owner or authorized user, administrator, or other authorized entity (e.g., police) of the attempt to clear the device without alerting the current device user (e.g., thief). In a step 910, a notification message is sent indicating that an unauthorized attempt to clear the device has been detected and blocked. The sending of the notification may be as described in step 810 (FIG. 8).

Referring now to FIG. 9, in a step 915, the security program hides the user data to simulate a successfully completed clear operation. For example, the security program may hide all the data stored the "/data" partition. In a specific implementation, hiding data such as files stored in the "/data" partition includes changing an attribute, property, or setting of the files from a first value to a second value, different from the first value, where the first value indicates that the files are viewable, and the second value indicates that the files are not viewable, i.e., hidden. In another specific implementation, hiding the user data may include moving the files from a viewable partition to a non-viewable or hidden partition.

For example, data could be moved from its original location in the/data partition to another location in the/data or other partition. Data files could be compressed. Data files could be encrypted. Data file permissions could be changed. Ownership of data files can be modified to be a designated special owner such that only the security program can access the files. If sufficient memory is available in other system components, such as the baseband processor or graphics processor then a portion of or all of the data could be moved to this other location. Or data can be transmitted off the device to a server and optionally removed from the device after such transmission has taken place. Or a combination of methods could be used.

In a step 920, the security program collects location tracking data, contextual data, or both. Collecting the data may be as described in step 820 (FIG. 8). In a step 925, the collected data is transmitted from the mobile device to at least one of the server, device administrator, or pre-specified network destination. The transmission may be as described in step 825 (FIG. 8).

Having a silent alert may increase the likelihood of catching the thief. The thief may believe he has gotten away with the crime. As a result, the thief may be less cautious in his actions. For example, the thief may leave the mobile device in a powered "ON" state rather than turning the device "OFF" or removing the battery. Thus, tracking and contextual data can continue to be collected without the thief's knowledge. Such tracking data may lead to the discovery of the thief's safe house where there may be other co-conspirators, stolen goods, and so forth.

Figure 10:
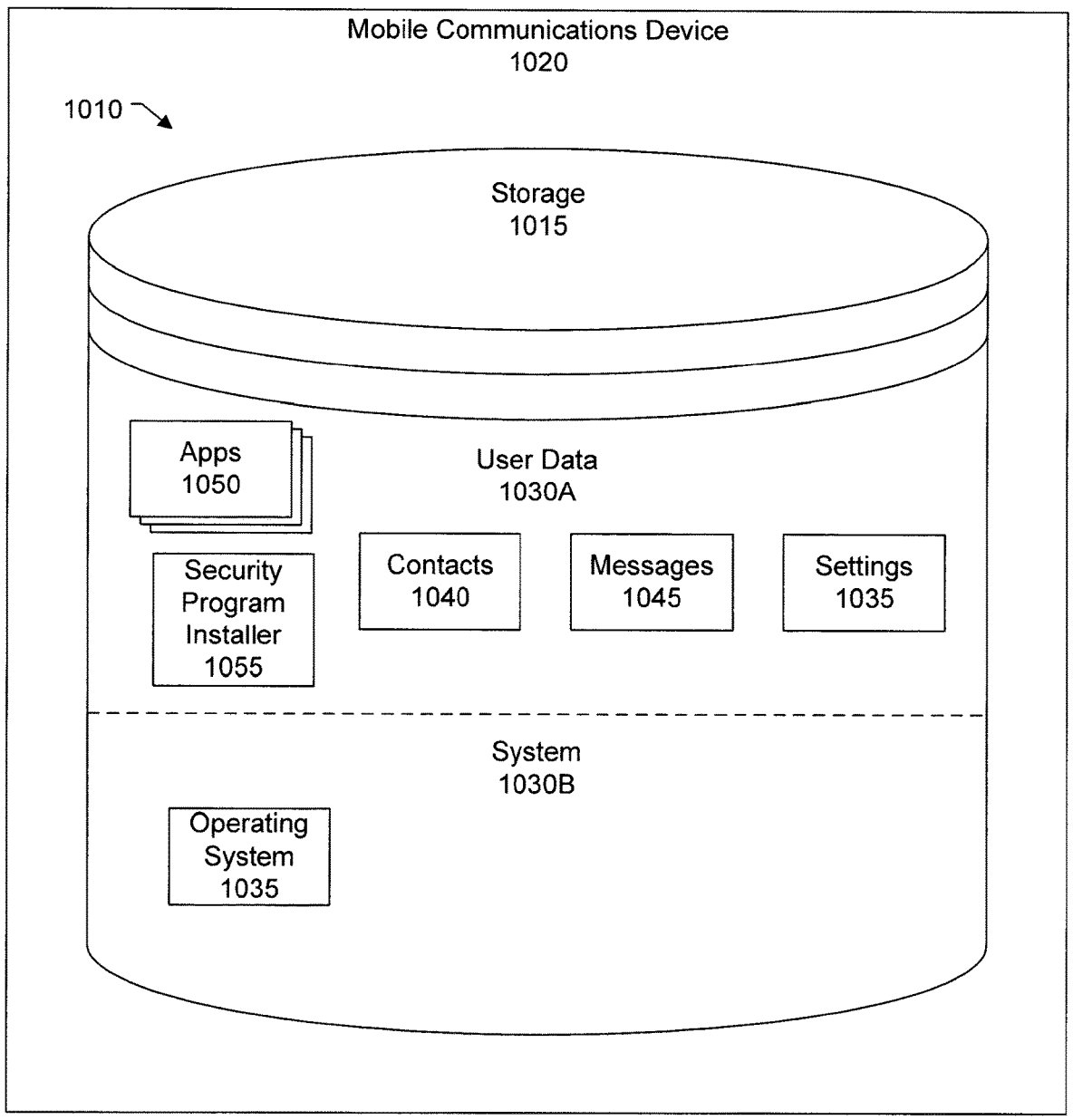
FIG. 10 shows a block diagram of a specific implementation of a security program installer on a mobile communications device in a first state.
Figure 11:
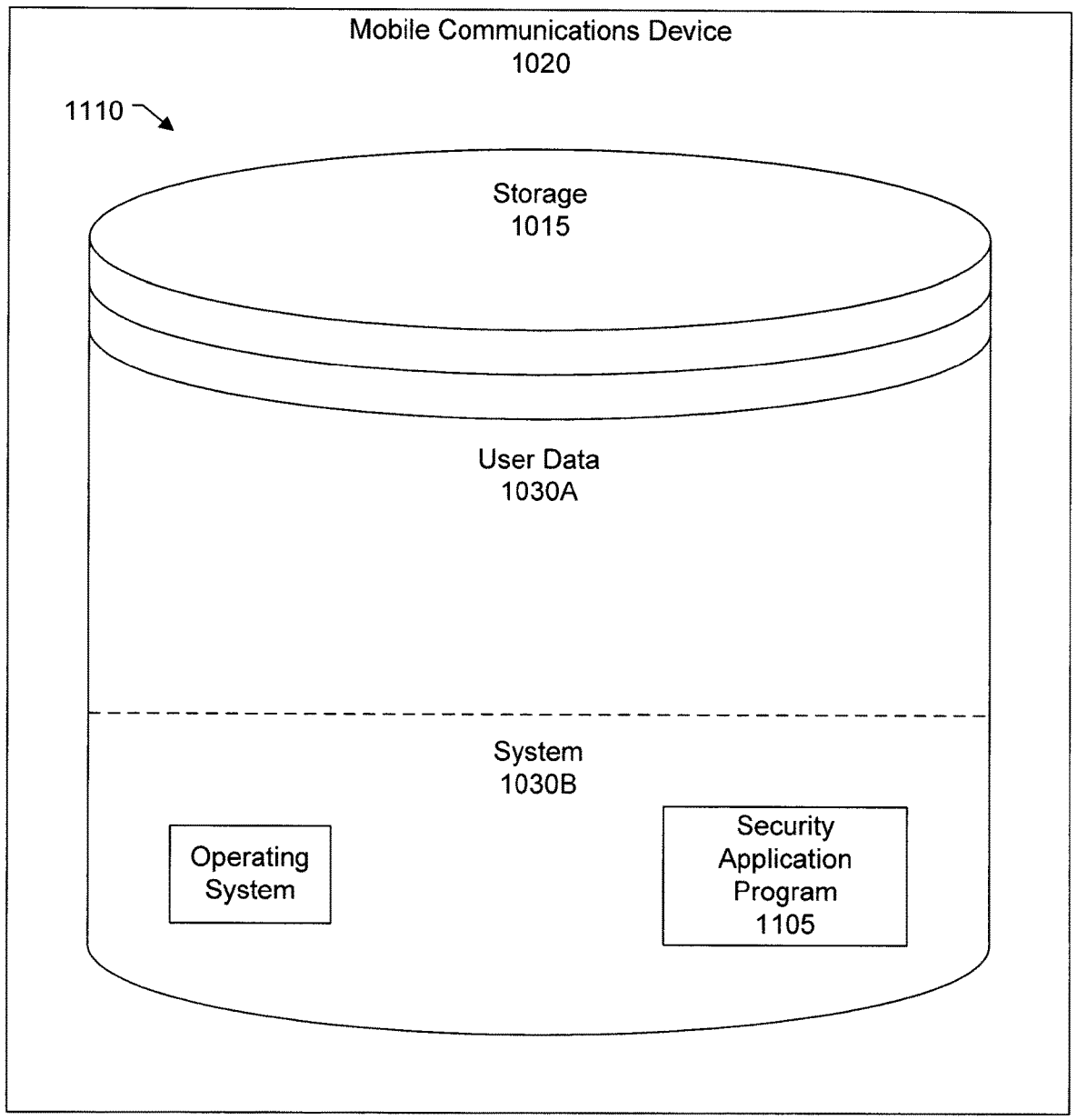
FIG. 11 shows a block diagram of the mobile device shown in FIG. 10 in a second state after the installer has installed a security application program in a system partition of the mobile device.
Figure 12:
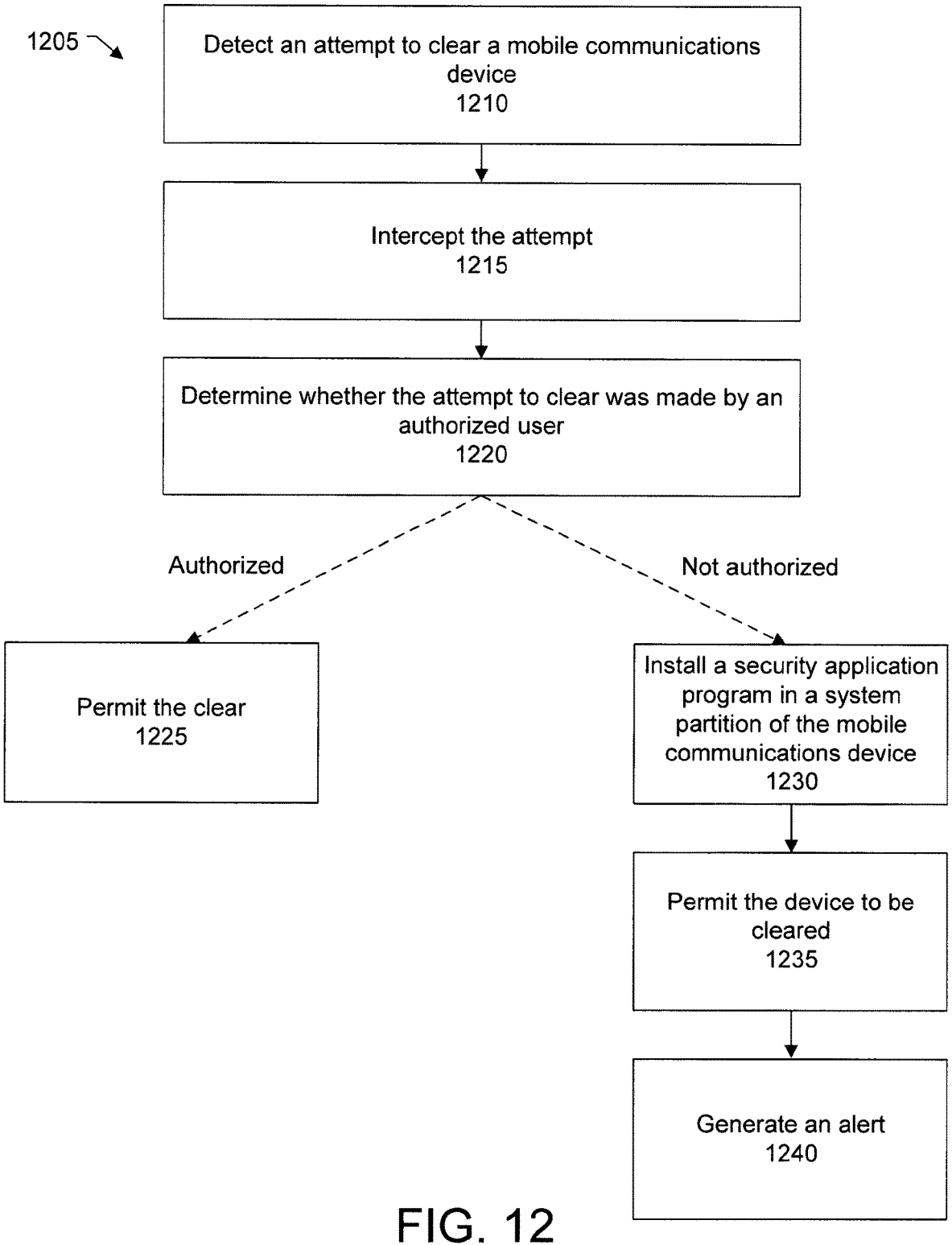
FIG. 12 shows a flow of a specific implementation of the security program installer.

FIGS. 10-12 show another specific implementation of a system for a persistent security mechanism. In this specific implementation, a security program is installed in a system partition of a memory of the device (or other memory location where data is not deleted with a clear operation) after the clear operation. In particular, FIG. 10 shows a first state 1010 of a storage component 1015 of a mobile communications device 1020. The storage component includes a "/data" partition 1030A and a "/system" partition 1030B. As discussed above, the "/data" partition can include the user's settings 1035, contacts 1040, messages 1045, and application programs or apps 1050 that the user has downloaded and installed on the mobile device. The "/system" partition includes system files such as operating system files 1035.

As shown in the example of FIG. 10, the user has installed a security installer program 1055. In this specific implementation, the security installer program is responsible for detecting an operation to clear the device and, upon the detection, install a security program 1105 (FIG. 11) in "/system" partition 1030B of the device. For example, FIG. 11 shows a second state 1110 of storage component 1015 from FIG. 11. In the second state, the user's data in the "/data" partition has been erased as a result of the clear operation. However, as a result of the clear operation, installer 1055 has installed security program 1105 in the "/system" partition.

FIG. 12 shows a flow 1205 for a specific implementation of the persistent security mechanism shown in FIGS. 10-11.

This specific implementation may be referred to as a "just in time" installation. A thief, prior to wiping the device, will not see the security program on the device because the program has yet to be installed. In other words, a potential advantage could be to obscure from the thief that such a security program is installed; the thief looks in the /system partition and doesn't see a security program, and thinks he is free to wipe; but on commencing the wipe, the security program gets installed "just in time." This approach can be implemented by a part of the operating system, or by a "watchdog" program that listens to or intercepts a wipe command and performs the security program installation just in time. It is also the case that the security program in such an installation may be installed into the/data partition. Because of the interception of the wipe command, the security program has the opportunity to keep data around, to block the wipe command, to alert, to preserve the non-system installation of the security program, and so forth.

In a step 1210, the security program installer detects an attempt to clear the mobile communications device. The installer resides in a user data partition of the mobile communications device. In a specific implementation, the security program installer may be installed by the device owner or authorized user. For example, after purchasing the device, the device owner or authorized user may download the installer program from an application marketplace. In another specific implementation, the security program installer may be pre-loaded onto the mobile device.

In a step 1215, the security program installer intercepts the attempt. In a step 1220, the security program installer determines whether the attempt to clear the device is being made by a user authorized to clear the device. The determination may be as shown in step 520 (FIG. 5) and described above. In a step 1225, if the user is authorized, the security program installer permits the clear. In a step 1230, if the user is not authorized, the security program installer installs a security program in the system partition of the mobile communications device. Installing the security program in the system partition helps to ensure that the security program will not be erased during the data clear operation.

In a specific implementation, the installer downloads the security program from the server after the determination is made of the user not being authorized. This helps to conserve storage space on the mobile device because the security program will be downloaded as-needed. In another specific implementation, the security program may be downloaded when the installer program is initially downloaded to the mobile device. The security program may be stored on the mobile device in a compressed state (e.g., as a ZIP file) and uncompressed upon the determination of the user not being authorized. This approach can be advantageous in cases where a network may be unavailable.

In a step 1235, after the security program has been installed in the system partition, the installer program permits the device to be cleared. However, the security program will remain on the device because it is installed in the system partition of the device. In a step 1240, the security program generates an alert. Generating the alert may be as show in FIG. 8 and described above. In another specific implementation, the security program generates a silent alert. Generating a silent alert may be as shown in FIG. 9 and described above. In another specific implementation, the data is hidden (rather then being cleared) as shown in FIG. 9 and described above.

Whether the data is cleared or hidden can be a user-configurable option. In some cases, a user may desire that a thief be allowed to clear the data as an extra precaution against identity theft. In other cases, another user may instead desire that the data be hidden so that the user does not have to restore the data to the device when the device is recovered.

Figure 13:
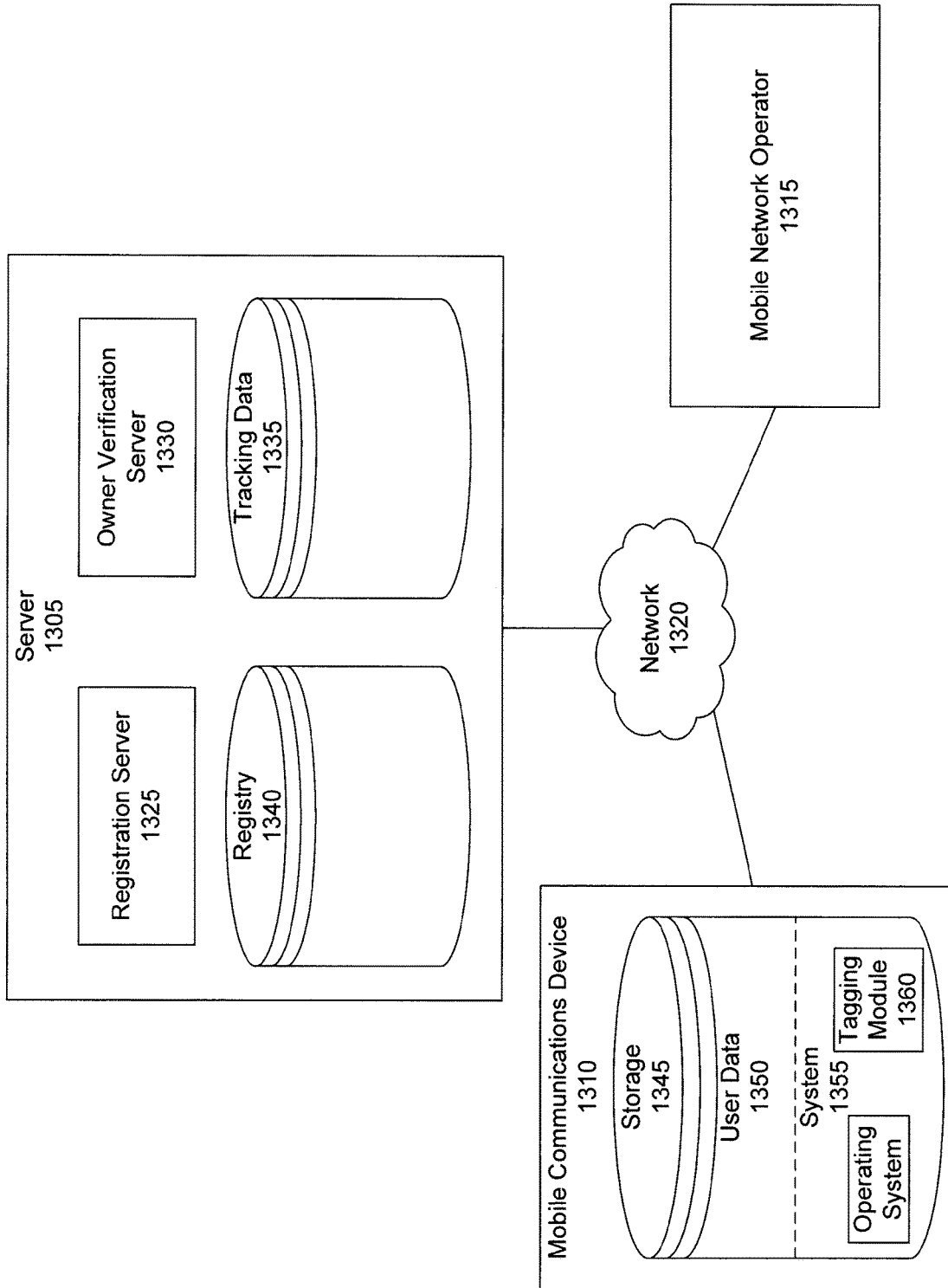
FIG. 13 shows a block diagram of a specific implementation of a registered owner service.

FIG. 13 shows a block diagram of another specific implementation of a system for a persistent security mechanism. This system may be referred to as a registered owner service (ROS). As shown in FIG. 13, there is a server 1305, a mobile communications device 1310, and a mobile network operator 1315 connected to a network 1320. The network is as shown in FIG. 1 and described above. The server is a general purpose computer (or system of general purpose computers) having hardware and software such as shown in FIG. 1 and described above. For example, the server may include a processor, memory, applications, and storage.

In a specific implementation, a user (or an application acting on behalf of the user) may register a device with a private or public ROS. An example of a private ROS is where a company, such as Lookout, owns and operates an ROS, or an enterprise owns and operates an ROS. It could also be private in the sense that it works only with Lookout (or the enterprise) applications or servers. A public ROS would be something which any carrier/operator can interact with, and with open APIs so that any vendor of security software can interact with it. In fact, an implementation of a public ROS may be a federation of multiple ROS systems, in which queries are referred to the ROS system of record for a particular device, without necessarily exposing all the related information that is in the ROS system of record. For example, enterprises may specify their own private ROS and register their ROS in to the public ROS system. Queries about devices owned by the enterprise OS would be directed to the enterprise's private ROS. Implementations can include the use of DNS servers and protocols, or other database mechanisms or web service interfaces. Individual component ROS's can be organized geographically or by carrier or by device manufacturer.

The device's unique identifier (e.g., IMEI) is registered with the service, along with the instructions that if this device ever appears on a public network in a "just CLEARed" state, then location tracking for the device is to be performed using the information in the ROS. Software is made part of the device image such that when a data Clear is performed, the device is put into a state such that communications with any network (baseband radio or WiFi, etc.) provides tagged info that device has been reset. Any communications provider upon seeing the tagged info that device has been reset sends the device's unique ID to a ROS (which can be a single server or a distributed infrastructure like a DNS system) which will reply to the communications provider whether the device has a registered owner. If the device has a registered owner, the communications provider will provide location tracking information to the ROS on a continuing basis until or unless the ROS specifies otherwise.

In this specific implementation, a carrier is the original registered owner for a device. When a carrier sells a device, the carrier will either change the registration to the identity of the device purchaser if the purchaser provides credentials, or will change the registration to "sold but no registration by current owner." The owner of the device can later choose to register the device. An unregistered device will not have the post-data-clear location tracking functionality.

An owner or authorized user of a device wishing to perform a data clear can perform the clear and then can update the ROS (by providing the registered credentials), or can instruct a third party (e.g., Lookout, Inc.) to perform the clear and then update the ROS, or in an embodiment can instruct the ROS to perform the clear directly. Authorized clear operations change the device state so that it will not be tagging device communications with a "just CLEARed" flag.

In this specific implementation, in the event of the device having been registered with the ROS and then sold to another person, the device's carrier will have the capability to making a change to the owner of record in the ROS; this change will involve notification to the previous owner of record, and will be a notice permanently available in the event of theft or fraud.

More particularly, server 1305 includes a registration server 1325, an owner verification server 1330, a database 1335, and a database 1340. The registration server is responsible for processing requests to register a user of the mobile communication device as an owner of the device. The owner verification server is responsible for processing requests to verify ownership of the mobile communications device. Database 1335 stores tracking data, contextual data, or both that may be collected by the mobile communications device, mobile network operator or both. Database 1340 stores a registry of mobile device owners.

FIG. 14 shows an example of some of the information that may be stored in a registry 1405. The registry stores a set of records 1410 that help track the ownership of the mobile device. In this example, the registry includes fields 1410A-1410E. First field 1410A stores an identifier for the device. In a specific implementation, an identifier includes an IMEI of the device. The identifier, however, can be any set of numbers, letters, symbols, characters, alphanumeric characters, or combinations of these that can be used to uniquely identify a particular mobile device.

Second field 1410B stores a device owner name (e.g., first name, last name). Third field 1410C stores a device username. When there is an additional authorized user for a device other than the owner, the device username is for the additional authorized user. Fourth field 1410D stores a registration account password. Device owners can use their username and password to log into their account. Once logged in, device owners can edit their account profile, enable or disable configuration options, report their device as, for example, missing, lost, stolen, or recovered, track their device, send instructions or commands to their device, change ownership (such as in the case of the device being properly resold), and so forth. There can be multiple owners (i.e., two or more owners) of a single mobile device. There can be authorized users who are not the owner. Fifth field 1410E stores a status of the device (e.g., OK, missing, lost, stolen, found, recovered, registered, or not registered).

Referring now to FIG. 13, a storage component 1345 of the mobile communications device includes a user data partition 1350 and a system partition 1355. The system partition includes a tagging module 1360. The tagging module may be pre-loaded on the device such as by a device manufacturer or carrier. In another specific implementation, the tagging module may be installed on the device by a device owner or authorized user. The tagging module is responsible for tagging communications or transmissions from the mobile device with a tag indicating that the mobile device had been cleared.

Mobile network operator 1315 is a provider of wireless communication services. The operator may maintain a wireless network infrastructure (e.g., base stations, or cell towers) and may own or control a radio spectrum license from a government or regulatory authority. The operator may be referred to as a wireless service provider, wireless carrier, cellular company, or mobile network carrier. Some specific examples of mobile network operators include Verizon, Sprint, T-Mobile, Orange, AT&T, China Mobile, and many others.

FIG. 15 shows a flow 1505 for registering a mobile communications device. In a step 1510, the registration server receives registration information. The registration information may include a device identifier (e.g., IMEI), name of owner and/or authorized user, account credentials (e.g., username and password), and the like. In a specific implementation, a registration wizard is launched when the user first turns on their device. The registration wizard presents the user with a set of graphical dialog boxes that guide the user through the registration process.

The user may choose to register the device at a later time. If the user does not register the device during the initial device setup, the user may be periodically reminded or prompted to register. For example, reminder messages may be sent via email, text message, or both. The message may include a link (e.g., hyperlink) that the user can click to begin the registration process. Clicking on the registration link may launch a browser that connects to the registration server. The registration web pages may be displayed in the browser.

In a step 1515, the registration information is stored in the registry (see, e.g., FIG. 14).

Figure 16:
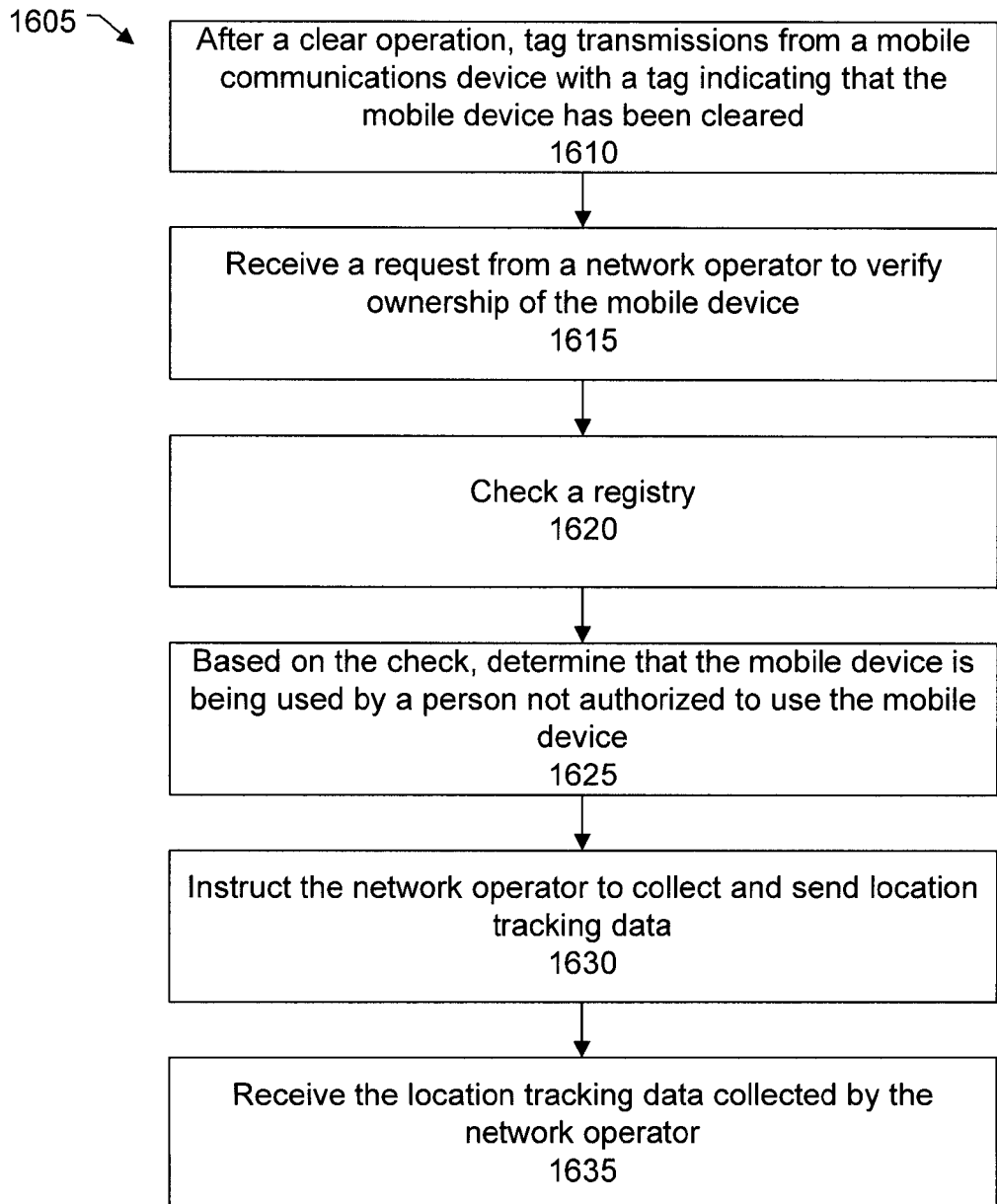
FIG. 16 shows a flow of a specific implementation for using the registered owner service.

FIG. 16 shows a flow 1605 for verifying device ownership based on a tagged communication from the mobile device. In a step 1610, after a clear operation on the mobile device has been made, the tagging module tags transmissions from the mobile device with a tag indicating that the device has been cleared. For example, the tag may be inserted into a header of a packet from the device, inserted into a data block of packet, or at another location within the packet.

The tagged transmission is received by the mobile network operator. The mobile network operator, upon discovering the tagged transmission generates a request to verify ownership of the mobile device. The mobile network operator transmits the request to the system, e.g., transmits the request to the owner verification server. In a step 1615, the system receives the request. The request may include a device identifier such as a device IMEI.

In a step 1620, the verification server checks the registry using the received device identifier to determine a status of the mobile device. The verification server may scan the registry with the received device identifier to find a matching record in the registry. Upon finding the matching record, the verification server can examine the record to determine the device status. As an example, consider the data shown in registry 1405 (FIG. 14). A record 1420 includes a device identifier value of "303." A device status of the record indicates that the device was reported "STOLEN."

In a step 1625, based on the check of the registry, the verification server may determine whether the mobile device is being used by an unauthorized user. For example, the owner verification request may include the device identifier "303." According to the data shown in registry 1405, device identifier "303" corresponds to record 1420. Record 1420 includes a status indicating that the device was reported "STOLEN." Thus, in this example, the determination is that the device is being used by a person not authorized to use the device because the device has a status of "STOLEN."

In a step 1630, the owner verification server can respond to the request from the mobile network operator with an instruction to collect and send location tracking data associated with the (stolen) mobile communication device. In a step 1635, the location tracking data collected by the mobile network operator is received at the system and stored in the location tracking data database. The system can make the location tracking data available for the owner or authorized user of the device, the police, or other authorized entity. For example, the system may provide a website in which the device owner or authorized user can login to see a map (e.g., real-time map) indicating a current location of the device. The map can display a trace indicating a movement of the device over a period of time (e.g., last hour, last day, or last week). Tracking the movement of the stolen device can help in recovery. If the registry checked indicated that the mobile device is in fact being used by an authorized user, the mobile communications device is so informed so that it can cease the operation of tagging transmissions from the device.

Figure 17:
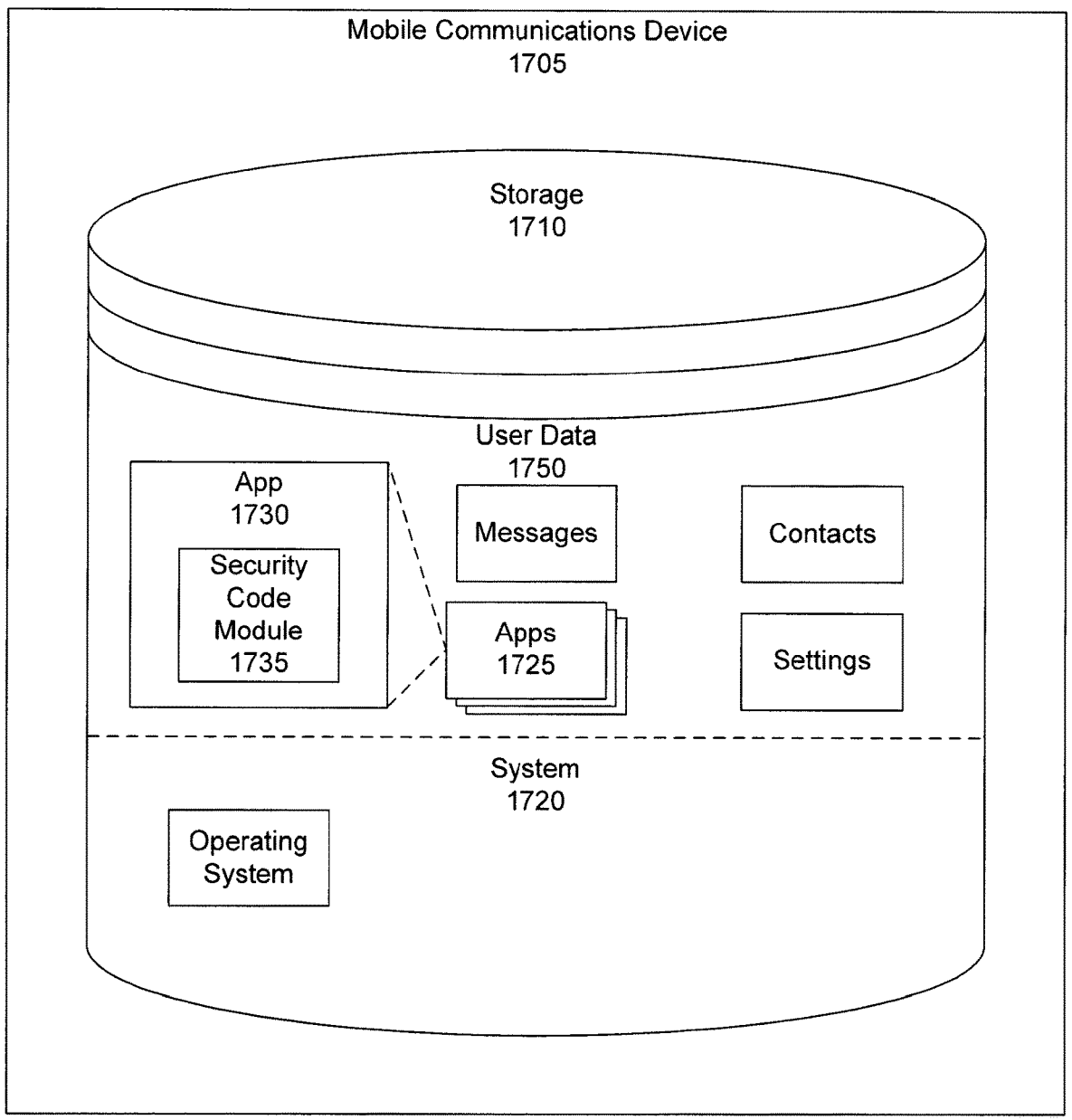
FIG. 17 shows a block diagram of a specific implementation of a security code module that is integrated into an application program.
Figure 18:
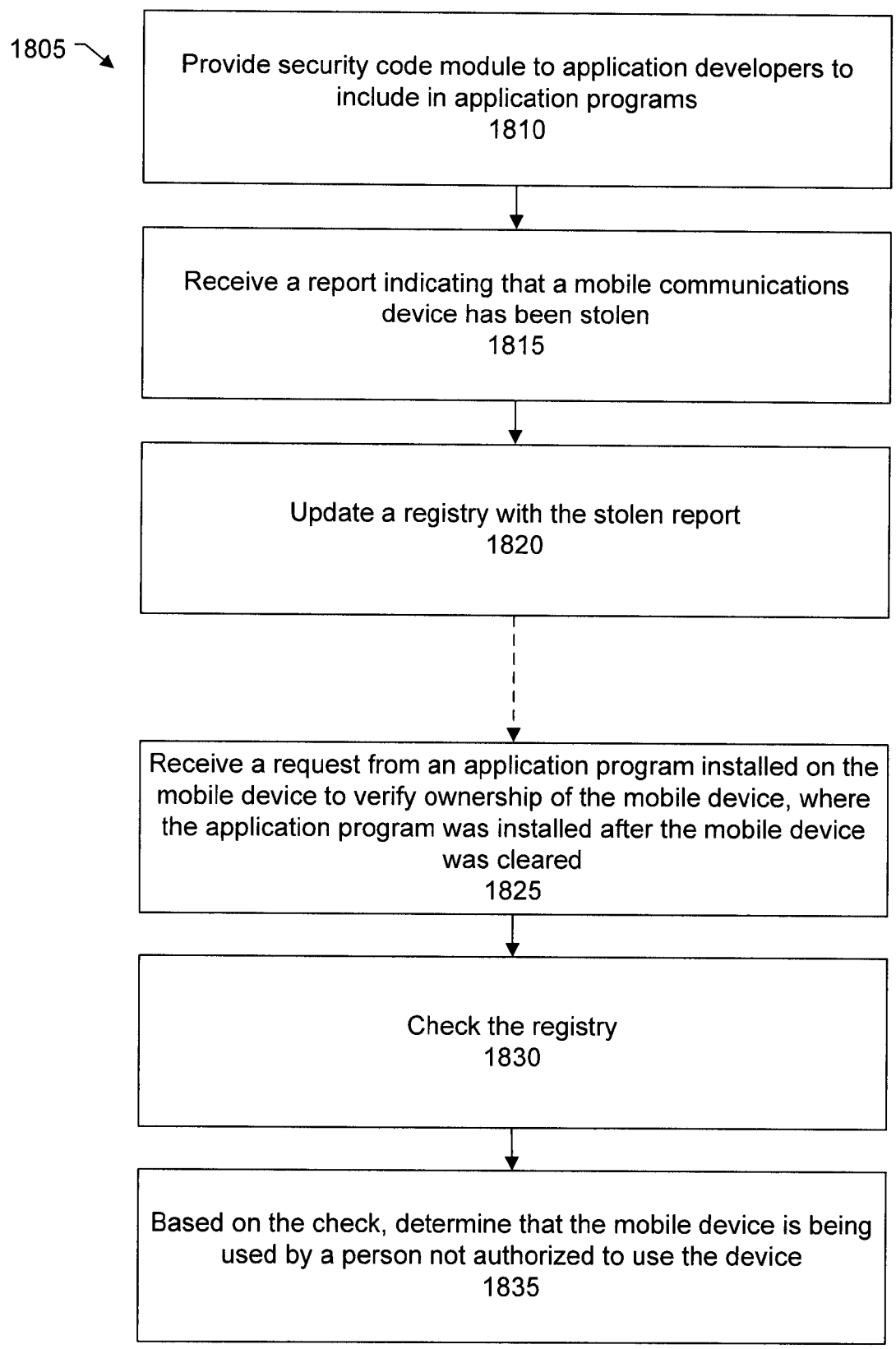
FIG. 18 shows a flow of a specific implementation of the security code module.

FIGS. 17 and 18 show another specific implementation of a system for helping to recover stolen or missing mobile communication devices. FIG. 17 shows a block diagram of a mobile communications device 1705. The device includes a storage component 1710. The storage includes a user data partition 1715 and a system partition 1720. The user data partition includes a set of application programs or apps 1725 that the user may have downloaded and installed from an application marketplace, user settings, messages, contacts, and the like.

In this specific implementation, an application program 1730 includes a security module 1735. The security code module is responsible for checking with the registration server to help determine the status of the mobile device.

For example, FIG. 18 shows a flow 1805 of a specific implementation of a system for helping to recover stolen or missing mobile communication devices. In a step 1810, the system provides the code (e.g., computer code) of the security module to application developers to include in their applications. The code may be provided as a set of application programming interfaces (APIs) or components or a library that application developers can use. The code may be made available on a web page of the system so that application developers can copy and paste the code into their application programs or can be distributed by other means.

In a specific implementation, the security module code is provided for free or without charge to the application developers. The application developer may be incentivized to include the module in their application programs because the module will help their customers recover their mobile devices in cases of loss or theft. In some cases, an application developer may be compensated for including the security module code component in their applications.

The security module code may be made available to, for example, developers of popular application programs, e.g., Angry Birds, Facebook, Minecraft, Wreck-it Ralph, Fruit Ninja, Need for Speed, and many others. External sites may be consulted in order to identify popular applications (see e.g., <http://en.wikipedia.org/wiki/List of most downloaded Android applications>, <https://play.google.comistore/apps/developer?id=MOST+POPULAR+ANDROID+APPS>, <https://play.google.com/store/apps/collection/topselling_free>, and <https://play.google.com/store/apps/collection/topselling_paid>).

Some other specific examples of popular applications include Maps by Google; App by Developer; Facebook by Facebook; WhatsApp Messenger by WhatsApp Inc.; Angry Birds by Rovio Mobile Ltd.; YouTube by Google; Skype by Skype; Twitter by Twitter; Adobe Flash Player 11 by Adobe Systems; Facebook Messenger by Facebook; Gmail by Google; Fruit Ninja Free by Halfbrick Studios; Street View on Google Maps by Google; Adobe Reader by Adobe Systems; Voice Search by Google; Google+ by Google; Google Search by Google; Google Play Books by Google; Google Play services by Google; Instagram by Instagram; Temple Run by Imangi Studios; KakaoTalk Free Calls & Text by Kakao; Pandora® internet radio by Pandora; GO Launcher EX by GO Launcher Dev Team; Angry Birds Seasons by Rovio Mobile Ltd.; Angry Birds Rio by Rovio Mobile Ltd.; Viber: Free Calls & Messages by Viber Media, Ltd; LINE: Free Calls & Messages by NAVER; Angry Birds Space by Rovio Mobile Ltd.; Tango Text, Voice, Video Calls by Tango; Advanced Task Killer by ReChild; Barcode Scanner by ZXing Team; Dropbox by Dropbox, Inc.; Pool Master Pro by TerranDroid; Shoot Bubble Deluxe by City Games LLC; Google Translate by Google; Google Play Music by Google; Chrome—browser from Google by Google; Opera Mini web browser by Opera Software; Google Play Movies & TV by Google; Subway Surfers by Kiloo Games; Ant Smasher, Best Free Game by Best Cool & Fun Free Games; PicsArt Photo Studio by PicsArt.

In a step 1815, the system receives a report from an owner or authorized user of the device that the device is missing or has been stolen. As an example, consider that there is a device owner. The device owner registers the mobile device with the ROS (Registered Owner Service) as shown in FIG. 15 and discussed above. Afterwards, a thief steals the device. The owner can log into the ROS system such as via another client computer and file a report indicting that their device has been stolen. In a step 1820, the system updates the registry with the report that the device has been reported as stolen.

In some cases, the thief will clear the device in order to then resell the device. Clearing the device may result in all user data stored on the device to be erased or deleted. For example, the clearing operation may delete application programs that the device owner or authorized user has installed on the device, the device owner's or authorized user's settings, contacts, messages, and so forth. The purchaser of the stolen device may proceed to install application programs on the device. Depending on factors such as the number of application developers who have included the security module in their application programs, the popularity of the applications, and others, there may be a high likelihood that the purchaser downloads and installs on the stolen device an application program that includes the security module.

Once the application program having the security module is installed on the stolen device, the security module generates a request to verify ownership of the device. In a step 1825, the system, e.g., ownership verification server receives the request to verify ownership. The request may include, for example, the device identifier, e.g., IMEI, or any other type of identifier or combination of identifiers that are stored in locations capable of surviving a wipe. In a specific implementation, the request is received from an application program having the security module where the application program is installed on the device after the device was cleared.

In a step 1830, the ownership verification server checks the registry. In a step 1835, based on the check, a determination may be made that the mobile communications device is being used by a person who is not authorized to use the device. Checking the registry and making the determination of unauthorized use may be as shown in steps 1620-1625 (FIG. 16) and described in the discussion accompanying FIG. 16. Upon making the determination of unauthorized use, an alert may be generated. For example, the system may transmit to the device owner or authorized user listed in the registry a notification (e.g., email or text message) indicating the device has been located. A notification may be transmitted to the police. A notification may be transmitted to the mobile network operator so that the operator can begin to collect location tracking data associated with the device.

In a specific implementation, a method includes sending from an application program on a mobile communications device a request to verify ownership of the mobile communications device to a server. The request may include one or more identifiers associated with the mobile communications device. For example, the request may include two, three, four, or more than four identifiers. If one of the identifiers is one which absolutely can never be changed by a thief, then one may be sufficient. But if there are no identifiers which cannot be changed, then the more identifiers are the better in the hopes that at least one will not be altered by an otherwise technologically astute thief. In other words, including multiple identifiers can be advantageous because in some cases depending upon the type of identifier and sophistication of the thief, an identifier may be altered by the thief. The request may be sent the first time that the application program runs after installation on the mobile device. The request may be sent periodically from the application program.

In a specific implementation, a method includes upon an initial execution of an application program installed on a mobile communications device, sending from the application program to a server a request to verify ownership of the mobile communications device, receiving a response to the request, if the response indicates that the mobile communications device is being used by a user authorized to use the mobile communications device, upon a subsequent execution of the application program, not sending the request, and if the response indicates that the mobile communications device is being used by a user not authorized to use the mobile communications device, entering a stolen mode.

The method may include upon entering the stolen mode, tracking a geographical location of the mobile communications device, transmitting the geographical location to the server, the authorized user (or owner), or combinations of these. The application program may coordinate with other application programs that are installed or later installed on the mobile device in order to avoid ownership verification checks by the other application programs if an ownership verification check has already been performed. For example, a later installed application may check with an earlier installed application to determine whether or not the earlier installed application has submitted an ownership verification check. If the earlier installed application has submitted the ownership verification check, the later installed application may not transmit an ownership verification check.

In other words, in this specific implementation, before the later installed application program transmits a request to verify ownership of the device, the later installed application determines whether or not the earlier installed application has transmitted the request. If the earlier installed application has transmitted the request, the later installed application may not transmit the request. This helps to avoid duplication of efforts.

In another specific implementation, the application program may periodically check the registry to verify ownership. The verification checks may be performed each time the application program is launched. Alternatively, determining whether or not to perform a verification check may be based on factors such as when the last verification check was performed, a number of verification checks since the last verification check, or other factors. For example, if the last verification check was performed very recently then it might not be worthwhile to immediately perform another verification check. Performing verification checks consumes computing resources (e.g., battery power, network bandwidth, or processor time). So, it is desirable to intelligently manage the verification checks.

In a specific implementation, a method includes upon an execution of an application program installed on a mobile communications device, sending from the application program to a server a request to verify ownership of the mobile device, receiving a response indicating that the mobile device has not been reported stolen, upon a subsequent execution of the application program, determining an elapsed amount of time between the execution and the subsequent execution, if the elapsed time is greater than a threshold duration, sending another request to verify ownership of the mobile device, and if the elapsed time is less than the threshold duration, not sending another request.

It should be appreciated that "owner or authorized user" as discussed in this patent application can include the situation where a company is the owner and the authorized user is an employee; or where a parent is the owner and a child is the authorized user, inter alia.

In a specific implementation, a method includes providing a security program to a system builder for the system builder to install the security program in a first memory partition of a mobile communications device, registering a first user as being an owner or authorized user of the mobile communications device, intercepting, by the security program, an attempt to clear all user data stored in a second memory partition of the mobile communications device, different from the first memory partition, determining that the attempt was made by a second user who is not registered as the owner or authorized user of the mobile communications device, and upon the determination, generating an alert.

In another specific implementation, a method includes registering a first user as being an owner or authorized user of a mobile communications device, detecting an attempt to clear all user data from the mobile communications device, determining that the attempt to clear all user data was made by a second user who is not registered as the owner or authorized user of the mobile communications device, and after the step of determining that the attempt to clear all user data was made by the second user, installing a security program on the mobile communications device.

In another specific implementation, a method includes storing a registry, registering in the registry a mobile communications device as having an owner, receiving from a communications provider of the mobile communications device a request to verify whether the mobile communications device has a registered owner, consulting the registry to verify whether the mobile communications device is registered, informing the communications provider of the registration, and based on the mobile communications device being registered, receiving location tracking information associated with the mobile communications device from the communications provider, where the request to verify whether the mobile communications device has a registered owner is sent by the communications provider after the communications provider receives from the mobile communications device an indication that the mobile communications device has been reset to a factory setting.

In a specific implementation, a "kill switch" is provided for a mobile communications device. The "kill switch" can include systems and techniques for rendering the mobile device inoperable. The "kill switch" can help to discourage theft of the mobile device.

Typically, most devices with a multistage boot use public key cryptography of some sort to either decrypt or authenticate the next bootloader. In a specific implementation, the "kill switch" includes dumping the key(s) which results in breaking the boot process in a way that would be trivial for a manufacturer to fix but exceedingly hard for a "bad guy" (e.g., thief) to repair without access to the private keys. Aspects of the "kill switch" can be applied to devices having the Android operating system and devices having the iOS operating system (e.g., iPhone). Generally, Android is less robust as the original equipment manufacturers (OEM's) typically implement their own boot processes, but most devices are still shipped with locked, secure bootloaders so while the keys that may be attacked vary the principle remains the same or similar.

More particularly, an Android device executes following steps when the power switch is pressed:

Step 1: Power On and System Startup

When power starts, the Boot ROM code starts execution from a pre-defined location which is hardwired on ROM. It loads Bootloader into RAM and start execution Step 2: Bootloader Bootloader is small program which runs before the Android operating system runs. Bootloader is the first program to run so it is specific for board and processor. Device manufacturers either use popular bootloaders like redboot, uboot, qi bootloader or they develop own bootloaders. It is not part of Android the operating system. Locks and restrictions may be placed in the bootloader by the OEMs and carriers.

The bootloader performs execution in two stages. In a first stage, it detects external RAM and loads a program which helps in a second stage. In the second stage the bootloader setups network, memory, etc. which includes running a kernel. The bootloader is able to provide configuration parameters or inputs to the kernel for a specific purpose.

The Android bootloader can include an "init.s" file and a "main.c" file. The file "init.s" initializes stacks, zeros the BSS segments, call_main( ) in main.c2. The file "main.c" initializes hardware (clocks, board, keypad, console), creates Linux tags Step 3: Kernel Android kernel start similar way as desktop linux kernel starts. In particular, at kernel launch it starts setup cache, protected memory, scheduling, loads drivers. When the kernel finishes system setup first thing it looks for is the "init" in system files and launches root process or first process of system.

Step 4: init Process

The very first process can be "init." It can be referred to as the root process or grandmother of all processes. The "init" process has two responsibilities. A first responsibility includes mounting directories like/sys, /dev, /proc. A second responsibility includes running "init.rc" script.

Android has specific format and rules for init.rc files. In Android, it is referred to as "Android Init Language." The Android Init Language includes four broad classes of statements, which are Actions, Commands, Services, and Options.

Action: Actions are named sequences of commands. Actions have a trigger which is used to determine when the action should occur.

Syntax
on <trigger>
<command>
<command>
<command>

Service: Services are programs which init launches and (optionally) restarts when they exit.

Syntax
service <name><pathname>[<argument>]*
<option>
<option>. . .

Options: Options are modifiers to services. They affect how and when init runs the service.

An example of a default init.rc file that includes some of the major events and services is as follows in Table E below.

TABLE E

| Action/Service | Description |
| --- | --- |
| on early-init | Set init and its forked children's oom_adj. |
| | Set the security context for the init process. |
| on init | setup the global environment |
| | Create cgroup mount point for cpu accounting and many |
| on fs | mount mtd partitions |
| on post-fs | change permissions of system directories |
| on post-fs-data | change permission of/data folders and sub folders |
| on boot | basic network init, Memory Management, etc |
| service servicemanager | start system manager to manage all native services like location, audio, shared preference etc. |
| service zygote | start zygote as app_process |

At this stage you can see "Android" logo on the device screen.

Step 5: Zygote and Dalvik

In a Java, a separate Virtual Machine (VMs) instance will popup in memory for separate per app. In the case of an Android app, the app should launch as quick as possible. If Android OS launches a different instance of Dalvik VM for every app then it consumes lots of memory and time. So, to overcome this problem Android OS has system named "Zygote". Zygote enable shared code across Dalvik VM, lower memory footprint and minimal startup time. Zygote is a VM process that starts at system boot time as we know in previous step. Zygote preloads and initialize core library classes. Normally, the core classes are read-only and part of Android SDK or Core frameworks. In Java VM each instance has its own copy of core library class files and heap objects.

Zygote Loading Process

1. Load ZygoteInit class,

Source Code:<Android Source>/frameworks/base/core/java/com/android/internal/os/ZygoteInit.java 2. registerZygoteSocket( )—Registers a server socket for zygote command connections 3. preloadClasses( )—"preloaded-classes" is simple text file contains list of classes that need to be preloaded, you can find "preloaded-classes" file at <Android Source>/frameworks/base 4. preloadResources( )—preloadResources means native themes and layouts, everything that include android.R file will be load using this method.

At this time you can see bootanimation

Step 6: System Service or Services

After completing the above steps, the runtime request Zygote to launch system servers. System Servers are written in native and java both. System servers can be considered as a process. The same system server is available as System Services in Android SDK. System server can include all system services.

Zygote forks a new process to launch system services. The source code is available in in ZygoteInit class and "startSystemServer" method.

Core Services:
1. Starting Power Manager
2. Creating Activity Manager
3. Starting Telephony Registry
4. Starting Package Manager
5. Set Activity Manager Service as System Process
6. Starting Context Manager
7. Starting System Context Providers
8. Starting Battery Service
9. Starting Alarm Manager
10. Starting Sensor Service
11. Starting Window Manager
12. Starting Bluetooth Service
13. Starting Mount Service Other Services
1. Starting Status Bar Service
2. Starting Hardware Service
3. Starting NetStat Service
4. Starting Connectivity Service
5. Starting Notification Manager
6. Starting DeviceStorageMonitor Service
7. Starting Location Manager
8. Starting Search Service
9. Starting Clipboard Service
10. Starting Checkin Service
11. Starting Wallpaper Service
12. Starting Audio Service
13. Starting HeadsetObserver
14. Starting AdbSettingsObserver Step 7: Boot Completed Once System Services up and running in memory, Android has completed booting process, At this time "ACTION_BOOT_COMPLETED" standard broadcast action will fire.

Dumping keys can include overwriting, or destroying the keys in some unrecoverable way. Because the device is powered up at the time an app or OTA sim app may be sent to the device which does this and then reboots the phone. As soon as the phone is power cycled, the corrupt boot-loader will cause it to hang. Apple idevices have a very secure and robust boot process due to having weathered so many unlock attacks. Additional measures may be taken with Android devices to help ensure the "bad guy" cannot just reinstall the factory firmware. In a specific implementation, recovery includes tethering the device to a workstation or other device that can push out a replacement, signed bootloader and new keys. This could be the customer.

In another specific implementation, a "kill switch" technique is used as an alternative to wiping. By removing the keys to decrypt and encrypted storage you render it inaccessible. This can be done early enough in the boot process and the manufacturer can fix it such that the data is recoverable by it owner. This specific implementation may be referred to as a soft wipe.

In a specific implementation, there is a removal of bootloader keys. In this specific implementation, in response to a communication from a server that the phone is stolen, a security program or module on the device with sufficient security privileges (it is a preloaded app or resides in the system partition or is part of the operating system or part of a bootloader or other program which runs prior to the operating system in a boot sequence) removes/destroys/overwrites the security/cryptographic keys which are used in the device's boot sequence to verify that boot is allowed. Optionally the security program then forces a power off or a reboot. Any subsequent reboot will be unable to complete because the necessary security/cryptographic keys are no longer present, rendering the device inoperative. The device can be restored to an operative state by an authorized user who is in physical possession of the device.

In another specific implementation, there can further be a special communication mode. In this specific implementation, a device attempting to boot and detecting the absence of the enabling security/cryptographic keys boots instead into a special mode in which a communication is attempted with a server to obtain the necessary security/cryptographic keys. A server in response, if the device is no longer marked as stolen, can provide the necessary security/cryptographic keys to the device, allowing it to perform a normal boot sequence and thus restoring it to normal operation. Or the device can be restored to an operative state by an authorized user who is in physical possession of the device. Optionally the security program or module can supply device location or context information to the server during its communication.

In another specific implementation, there is a soft wipe by removing encryption/decryption keys. In this specific implementation, there is an assumption there are security/cryptographic keys on the device which are used to decrypt device storage contents which are already encrypted. In response to a communication from a server that the phone is stolen, a security program or module on the device with sufficient security privileges (it is a preloaded app or resides in the system partition or is part of the operating system or part of a bootloader or other program which runs prior to the operating system in a boot sequence) removes/destroys/overwrites the security/cryptographic keys which are used to decrypt device storage contents which are already encrypted. This renders the device inoperative during any subsequent attempted reboot. Optionally the security program then forces a power off or a reboot. Any subsequent reboot will be unable to complete because the necessary security/cryptographic keys are no longer present, rendering the device inoperative. The device can be restored to an operative state by an authorized user who is in physical possession of the device.

In another specific implementation, there can further be a command to encrypt the device storage and then destroy the device copy of the keys. In this specific implementation, in response to a command from a server, a security program or module on the device encrypts storage on the device with a key supplied by the server, but does not store the keys necessary for decryption of the encrypted storage on the device, thus rendering the device inoperative. Optionally the security program or module then initiates a power off or reboot sequence. This reboot will not complete successfully (or a reboot after a power off sequence has completed). The device can be restored to an operative state by an authorized user who is in physical possession of the device.

In another specific implementation, keys to be destroyed may be stored in a Trusted Platform Module (TPM) or hardware component that will require physical replacement. In this specific implementation, the security/cryptographic keys are stored in a TPM or a separate hardware component that supports a command to destroy the keys. In order to restore the phone to normal operation, the TPM will have to be repopulated with the necessary keys by an authorized dealer or user, or the separate hardware component containing the necessary keys will have to be physically replaced. Storing the security/cryptographic keys in a TPM or separate hardware component can be implemented in connection with the removal of bootloader keys or the softwipe as described above.

Figure 19:
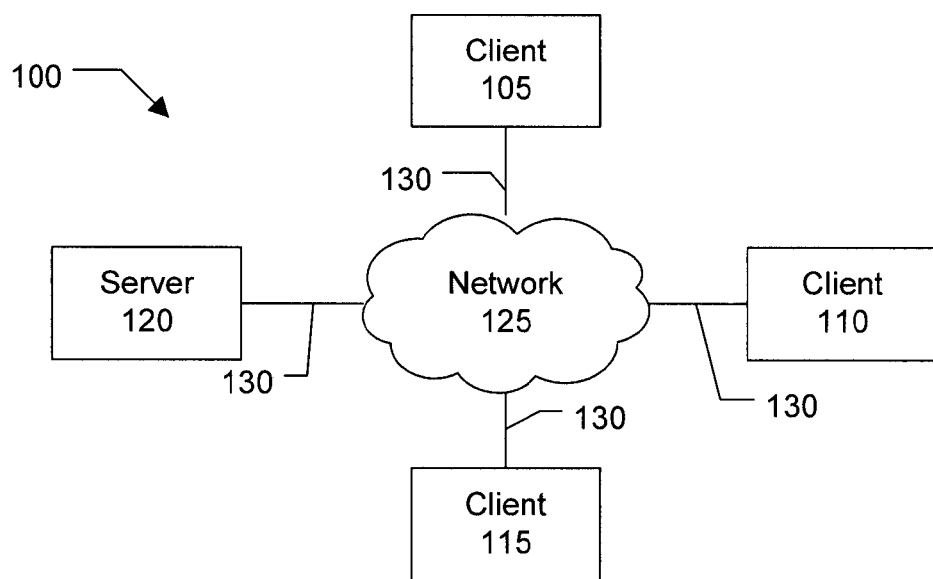
FIGS. 19-21 describe a specific implementation of systems and techniques to render a device unusable.
Figure 20:
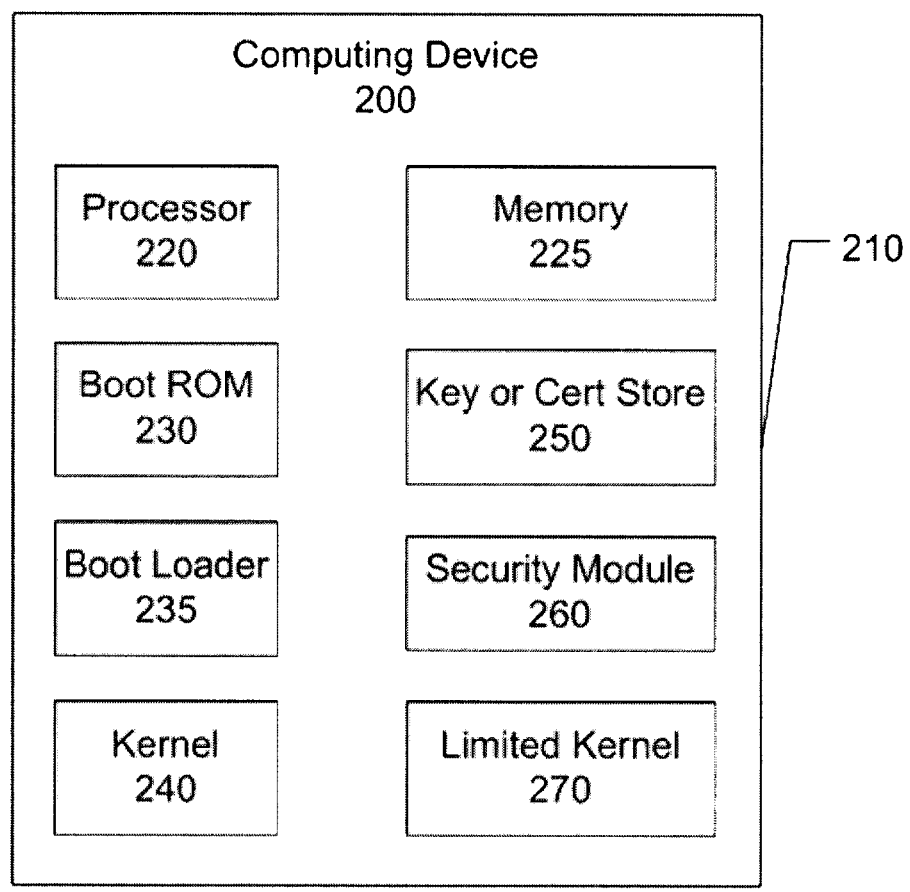
Figure 21:
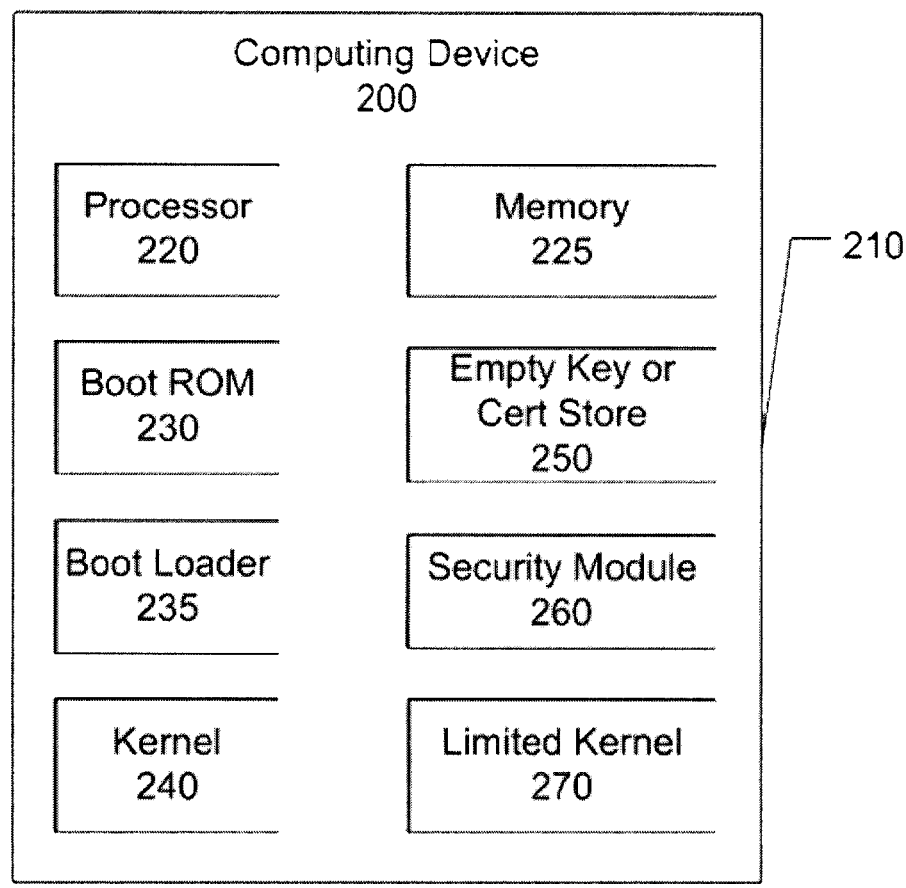

FIGS. 19-21 show a specific implementation for disabling a mobile device. FIG. 19 shows a server is one which either sends a command to Client to disable keys (either the disable boot scenario or the soft wipe scenario), or Client checks in with server and receives instruction from server to disable boot or soft wipe, or receives indication that phone is marked as stolen and therefore according to a policy should disable boot or perform a soft wipe.

Device has a sequence of components which are executed/called upon in a boot sequence. In this example we show a Boot ROM 230, a Boot Loader 235, and a Kernel 240. But any sequence of components can be used, e.g., in the iPhone there is a BootROM, a first level boot loader (LLB), a second level boot loader (iBoot), and a kernel (e.g., see "iPhone Forensics—Rahil Parikh's Blog.pdf" or "US20090257595A1.pdf" or "Notes on the boot sequence.pdf"; for Android, see "In Depth_Android Boot Sequence_Process~KP Bird.pdf" or "Android Booting-eLinux.org.pdf" which are incorporated by reference).

In an embodiment the Key or Cert Store 250 is used at one or more points in the boot sequence to verify the integrity of the software and the device and its components. Key or Cert Store 250 can be in a type of storage which can be destroyed but not re-written with other keys (one-way destruction); in this scenario replacement of this component would be required to re-enable the device. Or the Key or Cert Store 250 can be in a type of storage which can be written later by an authorized dealer or user or by the security module 260 with valid keys or certificates which will re-enable the device.

The Limited Kernel 270 is described in part below. When the Key or Cert Store 250 is empty (unavailable) in the boot sequence because its contents have been destroyed, in this embodiment the device is allowed to boot into the Limited Kernel 270 only, not the Kernel 240. The Limited Kernel can only securely communicate with the one server to report location and/or other contextual information, and/or in an embodiment to receive replacement keys or certificates.

In a specific implementation, the most secure implementation is one in which the Key or Cert Store 250 supports the destruction of the security/cryptographic keys or certificates contained therein, and which requires complete physical replacement to re-enable normal operation of the device.

The implementation in which the Key or Cert Store 250 is writeable still prevents a thief from reinstalling the factory firmware when the normal Key or Cert Store 250 contents will contain information (or a hash derived from) unique elements of the phone, such as the IMEI. A stock factory firmware would not have the required unique information to allow correct operation of the boot sequence.

The soft wipe scenario is desirable in conditions under which it is desirable to prevent a thief from reading the contents of the storage, but in which there may not be an off-device backup of the storage contents and it is considered possible that the device may be later recovered and returned to normal operation.

This patent application discusses new methods regarding the destruction of security/cryptographic keys or certificates to prevent a secure boot sequence from occurring. In a specific implementation, a "Limited Kernel" is provided which is used to boot into after phone has had its keys destroyed, and which can only communicate with a single server to report location or other contextual information, and/or to receive re-enablement security/cryptographic keys or certificates.

Figure 22:
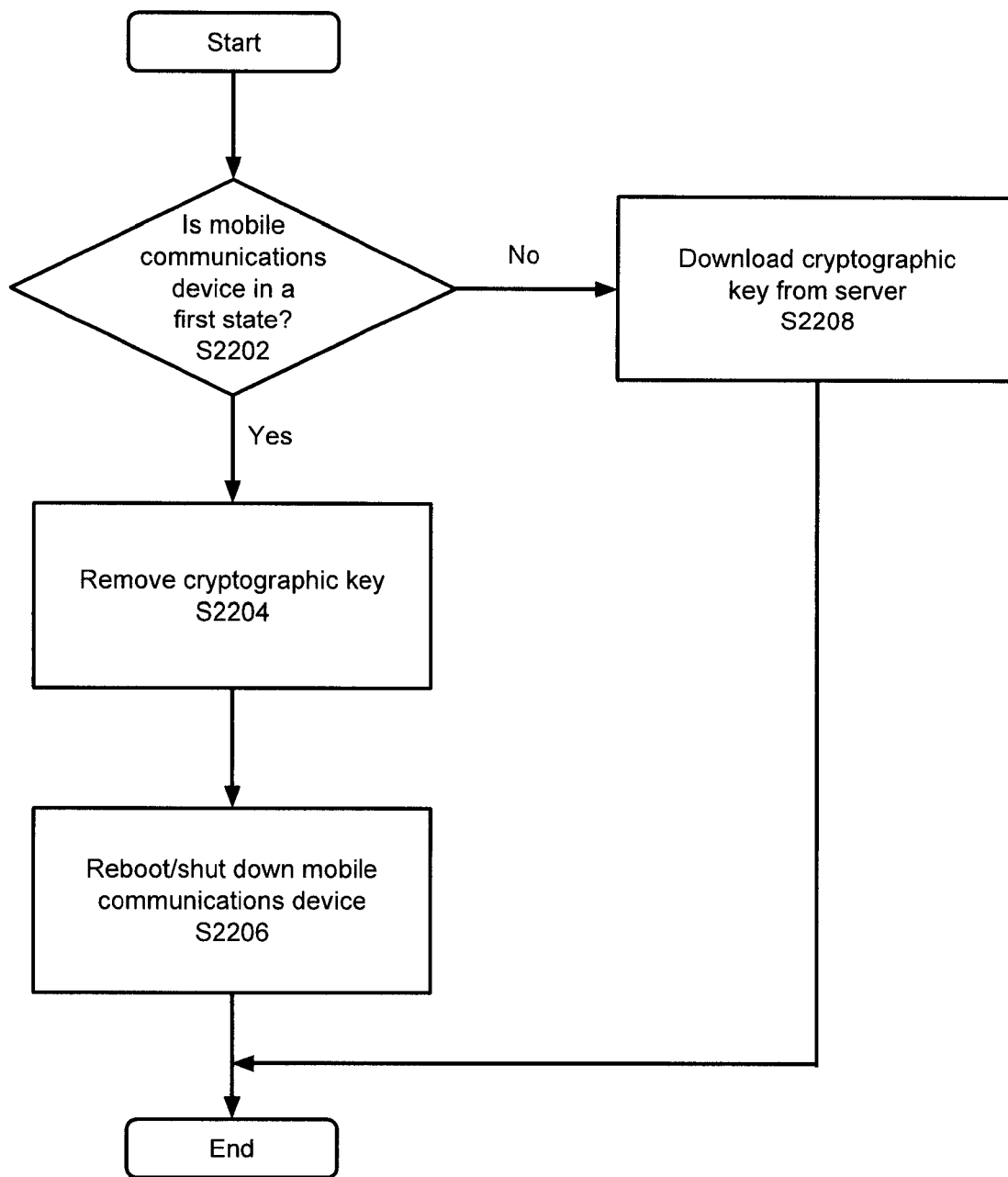
FIG. 22 illustrates an example method for rendering a stolen phone inoperative by removing cryptographic keys.

FIG. 22 illustrates an example method for rendering a stolen phone inoperative by removing cryptographic keys. A determination of whether the mobile communications device is in a first state is made is S2202. A removal of the cryptographic key on the mobile communications device is affected if the mobile communications device is determined to be in a first state is S2204. The first state may be, for example, a state where the mobile communications device is not in the possession of an authorized user. Once the removal of the cryptographic key has been affected, a reboot sequence or a power off sequence may be initiated on the mobile communications device at S2206. Upon booting up, the mobile communications device may enter into a specific mode such as one of a limited kernel. If in S2202 the mobile communications device is determined to be in a second state (i.e., the mobile communications device is in the possession of an authorized user), the cryptographic key may be received from the server in S2208. This cryptographic key, when provided, may replace a previously removed cryptographic key, and allow the mobile communications device to boot up normally.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
registering, at an owner verification server, a mobile device in response to receiving a registration request message, the registration request including device information and owner information associated with the mobile device;
receiving, at the owner verification server, a request to verify ownership message including an identifier of the mobile device, the request being received, from a mobile network operator server, in response to a tagged transmission being received by the mobile network operator server from the mobile device;
retrieving, by the owner verification server, an ownership status associated with the mobile device from a mobile device registry, the mobile device registry including ownership statuses for a plurality of registered mobile devices, where each ownership status may be updated based on received ownership status update reports;
transmitting, by the ownership verification server after the request to verify ownership message has been received, a request to the mobile network operator server to transmit location tracking data for the mobile device in response to both the mobile device registry including registered owner data and the ownership status of the mobile device indicating that the mobile device is not in the possession of an owner included in the owner information; and
forwarding, by the ownership verification server, the location tracking data to the owner included in the owner information.

2. The method of claim 1, the tagged transmission including a tag indicating that the mobile device has been cleared.

3. The method of claim 1, the registering comprising storing the device information and owner information associated with the mobile device in a registry database of an enterprise entity.

4. The method of claim 1, the registering comprising storing the device information and owner information associated with the mobile device in a public registry database accessible by the mobile network operator.

5. The method of claim 1, each mobile device in the mobile device registry either including registered owner data or an indication that a mobile device has been sold and there is no registration by a current owner of the mobile device.

6. The method of claim 1, further comprising receiving an authorized clear message from a registered owner of the mobile device, and logging the authorized clear message in the mobile device registry, where a record of the authorized clear message causes transmissions from the mobile device to not be tagged.

7. A system comprising a server including at least one processor and memory with instructions that when executed by the at least one processor cause the system to:
   register a mobile device in response to receiving a registration request message, the registration request including device information and owner information associated with the mobile device;
   receive a request to verify ownership message including an identifier of the mobile device, the request being received, from a mobile network operator server, in response to a tagged transmission being received by the mobile network operator server from the mobile device;
   retrieve an ownership status associated with the mobile device from a mobile device registry, the mobile device registry including ownership statuses for a plurality of registered mobile devices, where each ownership status may be updated based on received ownership status update reports;
   transmit a request to the mobile network operator server, after the request to verify ownership message has been received, to transmit location tracking data for the mobile device in response to both the mobile device registry including registered owner data and the ownership status of the mobile device indicating that the mobile device is not in the possession of an owner included in the owner information; and
   forward the location tracking data to the owner included in the owner information.

8. The system of claim 7, the tagged transmission including a tag indicating that the mobile device has been cleared.

9. The system of claim 7, the registering comprising storing the device information and owner information associated with the mobile device in a registry database of an enterprise entity.

10. The system of claim 7, the registering comprising storing the device information and owner information associated with the mobile device in a public registry database accessible by the mobile network operator.

11. The system of claim 7, each mobile device in the mobile device registry either including registered owner data or an indication that a mobile device has been sold and there is no registration by a current owner of the mobile device.

12. The system of claim 7, the instructions further comprising instructions that cause the system to receive an authorized clear message from a registered owner of the mobile device, and logging the authorized clear message in the mobile device registry, where a record of the authorized clear message causes transmissions from the mobile device to not be tagged.

13. A non-transitory computer-readable medium comprising instructions that when executed by a processor of a server cause the server to:
   register a mobile device in response to receiving a registration request message, the registration request including device information and owner information associated with the mobile device;
   receive a request to verify ownership message including an identifier of the mobile device, the request being received, from a mobile network operator server, in response to a tagged transmission being received by the mobile network operator server from the mobile device;
   retrieve an ownership status associated with the mobile device from a mobile device registry, the mobile device registry including ownership statuses for a plurality of registered mobile devices, where each ownership status may be updated based on received ownership status update reports;
   transmit a request to the mobile network operator server, after the request to verify ownership message has been received, to transmit location tracking data for the mobile device in response to both the mobile device registry including registered owner data and the ownership status of the mobile device indicating that the mobile device is not in the possession of an owner included in the owner information; and
   forward the location tracking data to the owner included in the owner information.

14. The non-transitory computer-readable medium of claim 13, the tagged transmission including a tag indicating that the mobile device has been cleared.

15. The non-transitory computer-readable medium of claim 13, the registering comprising storing the device information and owner information associated with the mobile device in a registry database of an enterprise entity.

16. The non-transitory computer-readable medium of claim 13, the registering comprising storing the device information and owner information associated with the mobile device in a public registry database accessible by the mobile network operator.

17. The non-transitory computer-readable medium of claim 13, each mobile device in the mobile device registry either including registered owner data or an indication that a mobile device has been sold and there is no registration by a current owner of the mobile device.

\* \* \* \* \*